United States Patent
Elshafie et al.

(10) Patent No.: US 12,328,673 B2
(45) Date of Patent: Jun. 10, 2025

(54) INFORMATION INDICATED BY LOW POWER WAKEUP SIGNAL

(71) Applicant: QUALCOMM Incorporated, San Diego, CA (US)

(72) Inventors: Ahmed Elshafie, San Diego, CA (US); Hung Dinh Ly, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 17/663,346

(22) Filed: May 13, 2022

(65) Prior Publication Data

US 2023/0370968 A1 Nov. 16, 2023

(51) Int. Cl.
*H04W 52/02* (2009.01)
*H04W 48/02* (2009.01)
*H04W 76/20* (2018.01)

(52) U.S. Cl.
CPC ....... *H04W 52/0229* (2013.01); *H04W 48/02* (2013.01); *H04W 52/0274* (2013.01); *H04W 76/20* (2018.02)

(58) Field of Classification Search
CPC ............. H04W 52/0229; H04W 48/02; H04W 52/0274; H04W 76/20; H04W 52/0216; H04W 76/27; Y02D 30/70
See application file for complete search history.

(56) References Cited

U.S. PATENT DOCUMENTS

| | | | |
|---|---|---|---|
| 9,814,025 B2* | 11/2017 | Jung | H04W 8/22 |
| 12,156,136 B2* | 11/2024 | Ye | H04J 13/0029 |
| 2018/0368055 A1* | 12/2018 | Chae | H04W 48/20 |
| 2020/0120604 A1* | 4/2020 | Nam | H04W 52/028 |
| 2020/0145921 A1* | 5/2020 | Zhang | H04W 52/0235 |
| 2021/0321334 A1* | 10/2021 | Thangarasa | H04W 52/0235 |

OTHER PUBLICATIONS

Vidal, José-Ramón, et al. "Performance study and enhancement of access barring for massive machine-type communications." IEEE Access 7 (2019): 63745-63759. (Year: 2019).*

Ruíz-Guirola, David E., et al. "Energy-efficient wake-up signalling for machine-type devices based on traffic-aware long short-term memory prediction." IEEE Internet of Things Journal 9.21 (2022): 21620-21631. (Year: 2022).*

* cited by examiner

*Primary Examiner* — Sharad Rampuria
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive, from a network node and via a first receiver component associated with the UE, a wakeup signal (WUS) or a reference signal indicating information including at least one of cell barring information, downlink buffer status report information, or an indication to monitor a synchronization signal. The UE may communicate, via a second receiver component associated with the UE, one or more signals based at least in part on the information included in the WUS or the reference signal. Numerous other aspects are provided.

30 Claims, 11 Drawing Sheets

INFORMATION INDICATED BY LOW POWER WAKEUP SIGNAL

FIELD OF THE DISCLOSURE

Aspects of the present disclosure generally relate to wireless communication and specifically, to techniques and apparatuses associated with information indicated by a low power wakeup signal (WUS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Various techniques have been introduced for transitioning a transceiver (also referred to herein as a receiver) of a user equipment (UE) out of a power-saving mode (for example, a sleep mode or a sleep state) and into an active mode. One technique includes transmitting a signal to the UE, which may indicate whether the UE is to monitor an upcoming (or a next) on duration associated with a discontinuous reception (DRX) cycle. The signal may be referred to as a wakeup signal (WUS). The UE may temporarily transition out of the power-saving mode (for example, by activating one or more modules or components, such as the baseband processor) to monitor a physical downlink control channel (PDCCH) for the WUS during a WUS occasion. The UE may use a relatively simple circuit to process the WUS, rather than powering on the associated modem or other components. In some examples, the UE may monitor an on duration based on receiving a WUS from a network node. For example, if the UE receives a WUS that indicates that the UE is to monitor the subsequent on duration (or fails to decode a WUS in a WUS occasion in some cases), then the UE may transition to the active state and may monitor the PDCCH for communications intended for the UE. If the UE receives a WUS that indicates that the UE is not to monitor the subsequent on duration, then the UE may enter a sleep state and may refrain from monitoring the PDCCH during the subsequent on duration. The WUS may enable the network node to conserve resources for the UE by enabling the network node to indicate to the UE when there will be traffic in an upcoming on duration and enabling the UE to refrain from monitoring the on duration if there is no traffic to be communicated during the on duration.

However, currently, a UE may only detect or receive a WUS that indicates whether the UE is to transmit or receive data (for example, that indicates whether the main receiver is to transition to an active state or an on state for upcoming data communications). For example, the WUS may be a binary signal (such as "wake up" or "no wake up"). For example, the UE may need to wake up a main receiver and communicate using the main receiver in order to obtain additional information associated with the network, such as mobility information, among other examples. This consumes additional power of the UE associated with waking up and communicating via the main receiver. In some examples, a WUS may indicate that the UE is to receive or communicate data. However, in some cases (such as when the UE is power limited or an energy harvesting device), the UE may be unable to receive or decode the data due to a size of the data. As a result, the UE may transition the main receiver to the active state to attempt to receive the data, but may not be capable of decoding or receiving the data, thereby needlessly consuming power associated with transitioning the main receiver into the active state.

SUMMARY

Some aspects described herein relate to a user equipment (UE) for wireless communication. The UE may include at least one memory and at least one processor communicatively coupled with the at least one memory. The at least one processor may be configured to cause the UE to receive, from a network node and via a first receiver component associated with the UE, a wakeup signal (WUS) or a reference signal indicating information including at least one of cell barring information, downlink buffer status report information, or an indication to monitor a synchronization signal. The at least one processor may be configured to cause the UE to communicate, via a second receiver component associated with the UE, one or more signals based at least in part on the information included in the WUS or the reference signal.

Some aspects described herein relate to a network node for wireless communication. The network node may include at least one memory and at least one processor communicatively coupled with the at least one memory. The at least one processor may be configured to cause the network node to transmit a WUS or a reference signal, intended for a UE, indicating information including at least one of: cell barring information, downlink buffer status report information, or an indication to monitor a synchronization signal. The at least one processor may be configured to cause the network node to communicate one or more signals associated with the UE based at least in part on the information included in the WUS or the reference signal.

Some aspects described herein relate to a method of wireless communication performed by a UE. The method may include receiving, from a network node and via a first receiver component associated with the UE, a WUS or a reference signal indicating information including at least one of cell barring information, downlink buffer status report information, or an indication to monitor a synchronization signal. The method may include communicating, via a second receiver component associated with the UE, one or more signals based at least in part on the information included in the WUS or the reference signal.

Some aspects described herein relate to a method of wireless communication performed by a network node. The method may include transmitting a WUS or a reference signal, intended for a UE, indicating information including at least one of: cell barring information, downlink buffer status report information, or an indication to monitor a synchronization signal. The method may include communicating one or more signals associated with the UE based at least in part on the information included in the WUS or the reference signal.

Some aspects described herein relate to a non-transitory computer-readable medium that stores a set of instructions for wireless communication by a UE. The set of instructions, when executed by one or more processors of the UE, may cause the UE to receive, from a network node and via a first receiver component associated with the UE, a WUS or a reference signal indicating information including at least one of cell barring information, downlink buffer status report information, or an indication to monitor a synchronization signal. The set of instructions, when executed by one or more processors of the UE, may cause the UE to communicate, via a second receiver component associated with the UE, one or more signals based at least in part on the information included in the WUS or the reference signal.

Some aspects described herein relate to a non-transitory computer-readable medium that stores a set of instructions for wireless communication by a network node. The set of instructions, when executed by one or more processors of the network node, may cause the network node to transmit a WUS or a reference signal, intended for a UE, indicating information including at least one of: cell barring information, downlink buffer status report information, or an indication to monitor a synchronization signal. The set of instructions, when executed by one or more processors of the network node, may cause the network node to communicate one or more signals associated with the UE based at least in part on the information included in the WUS or the reference signal.

Some aspects described herein relate to an apparatus for wireless communication. The apparatus may include means for receiving, from a network node and via a first receiver component associated with the apparatus, a WUS or a reference signal indicating information including at least one of cell barring information, downlink buffer status report information, or an indication to monitor a synchronization signal. The apparatus may include means for communicating, via a second receiver component associated with the apparatus, one or more signals based at least in part on the information included in the WUS or the reference signal.

Some aspects described herein relate to an apparatus for wireless communication. The apparatus may include means for transmitting a WUS or a reference signal, intended for a UE, indicating information including at least one of: cell barring information, downlink buffer status report information, or an indication to monitor a synchronization signal. The apparatus may include means for communicating one or more signals associated with the UE based at least in part on the information included in the WUS or the reference signal.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
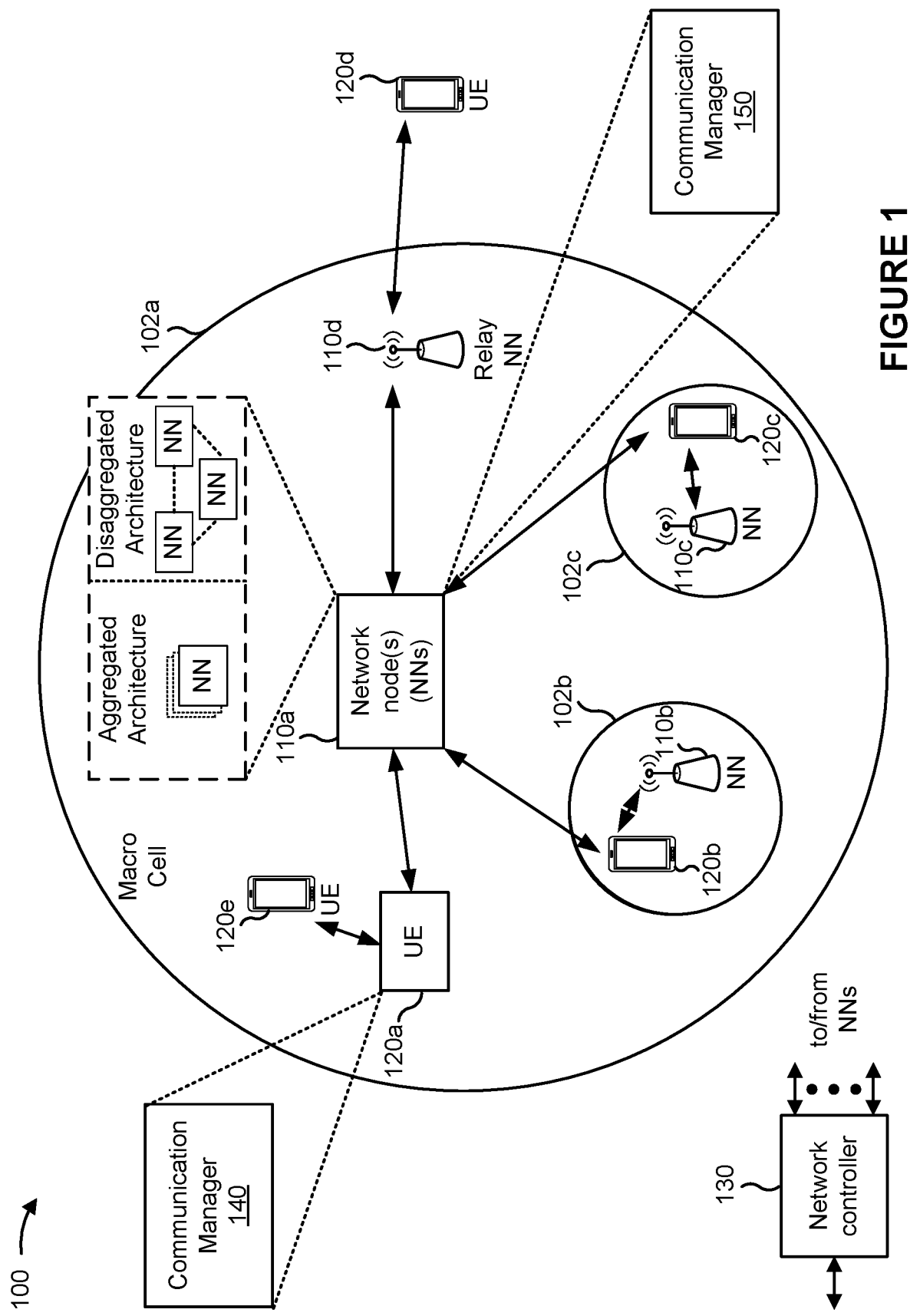
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to information indicated by a low power wakeup signal (WUS). Some aspects more specifically relate to including information in a WUS in addition to an indication of whether a user equipment (UE) is to transmit or receive data. For example, in some aspects, the UE may receive, via a first receiver component (such as a low power receiver or a low complexity receiver), a WUS or a reference signal indicating information including cell barring information, downlink buffer status report information, or an indication to monitor a synchronization signal, among other examples. The UE may communicate, via a second receiver component (for example, a main receiver), one or more signals based at least in part on the information included in the WUS or the reference signal.

For example, a WUS, received via the first receiver component of the UE, may indicate cell barring information indicating whether the UE is barred from establishing a connection with a given cell. If the WUS indicates that the UE is barred from establishing a connection with a given cell, then the UE may transition a second receiver component (for example, a main receiver) from a sleep state to an active state to perform a cell search procedure. As another example, a WUS, received via the first receiver component of the UE, may indicate a size of a downlink communication to be received by the UE (for example, via the downlink buffer status report information). The UE may determine whether the UE is capable of receiving a downlink communication having the size (for example, based at least in part on an energy harvesting class associated with the UE, an energy state associated with the UE, or a charging rate associated with the UE, among other examples). The UE may selectively activate the second receiver component (for example, the main receiver) based at least in part on whether the UE is capable of receiving a downlink communication having the size.

Particular aspects of the subject matter described in this disclosure can be implemented to realize one or more of the following potential advantages. In some examples, the described techniques can be used to improve wakeup operations performed by a UE by providing additional information to the UE to facilitate wakeup determinations. As a result, the UE may conserve power by enabling the UE to maintain a sleep state (for example, when the UE is unable to receive a downlink communication intended for the UE, such as due to the size of the downlink communication). Additionally, communication performance of the UE may be improved by enabling the UE to reduce a latency associated with performing cell search procedures or by enabling the UE to perform synchronization operations (such as by waking up to receive and decode a synchronization signal block (SSB)), among other examples.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing 284 that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node and via a first receiver component associated with the UE, a WUS or a reference signal indicating information including at least one of cell barring information, downlink buffer status report information, or an indication to monitor a synchronization signal; and communicate, via a second receiver component associated with the UE, one or more signals based at least in part on the information included in the WUS or the reference signal. Additionally or alternatively, the communication manager 140 may perform one or more other operations described herein.

In some aspects, the network node 110 may include a communication manager 150. As described in more detail elsewhere herein, the communication manager 150 may transmit a WUS or a reference signal, intended for a UE, indicating information including at least one of: cell barring information, downlink buffer status report information, or an indication to monitor a synchronization signal; and communicate one or more signals associated with the UE based at least in part on the information included in the WUS or the reference signal. Additionally or alternatively, the communication manager 150 may perform one or more other operations described herein.

Figure 2:
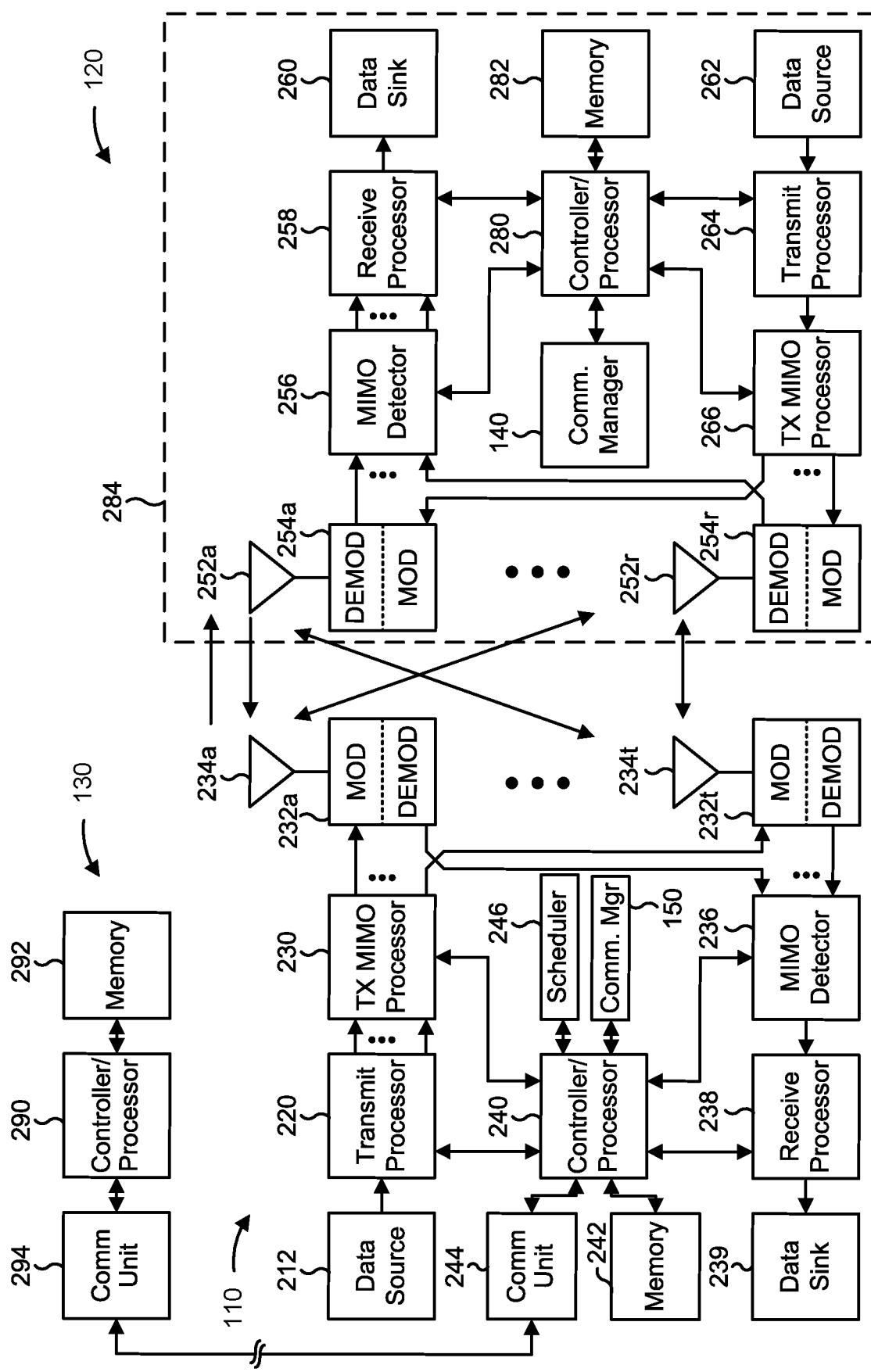
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with associated with information indicated by a low power wakeup signal, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, or other processes as described herein. In some examples, executing instructions may include running the instructions, converting the instructions, compiling the instructions, or interpreting the instructions, among other examples.

In some aspects, the UE 120 includes means for receiving, from a network node and via a first receiver component associated with the UE, a WUS or a reference signal indicating information including at least one of cell barring information, downlink buffer status report information, or an indication to monitor a synchronization signal; or means for communicating, via a second receiver component associated with the UE, one or more signals based at least in part on the information included in the WUS or the reference signal. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a WUS or a reference signal, intended for a UE, indicating information including at least one of: cell barring information, downlink buffer status report information, or an indication to monitor a synchronization signal; or means for communicating one or more signals associated with the UE based at least in part on the information included in the WUS or the reference signal. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (for example, a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
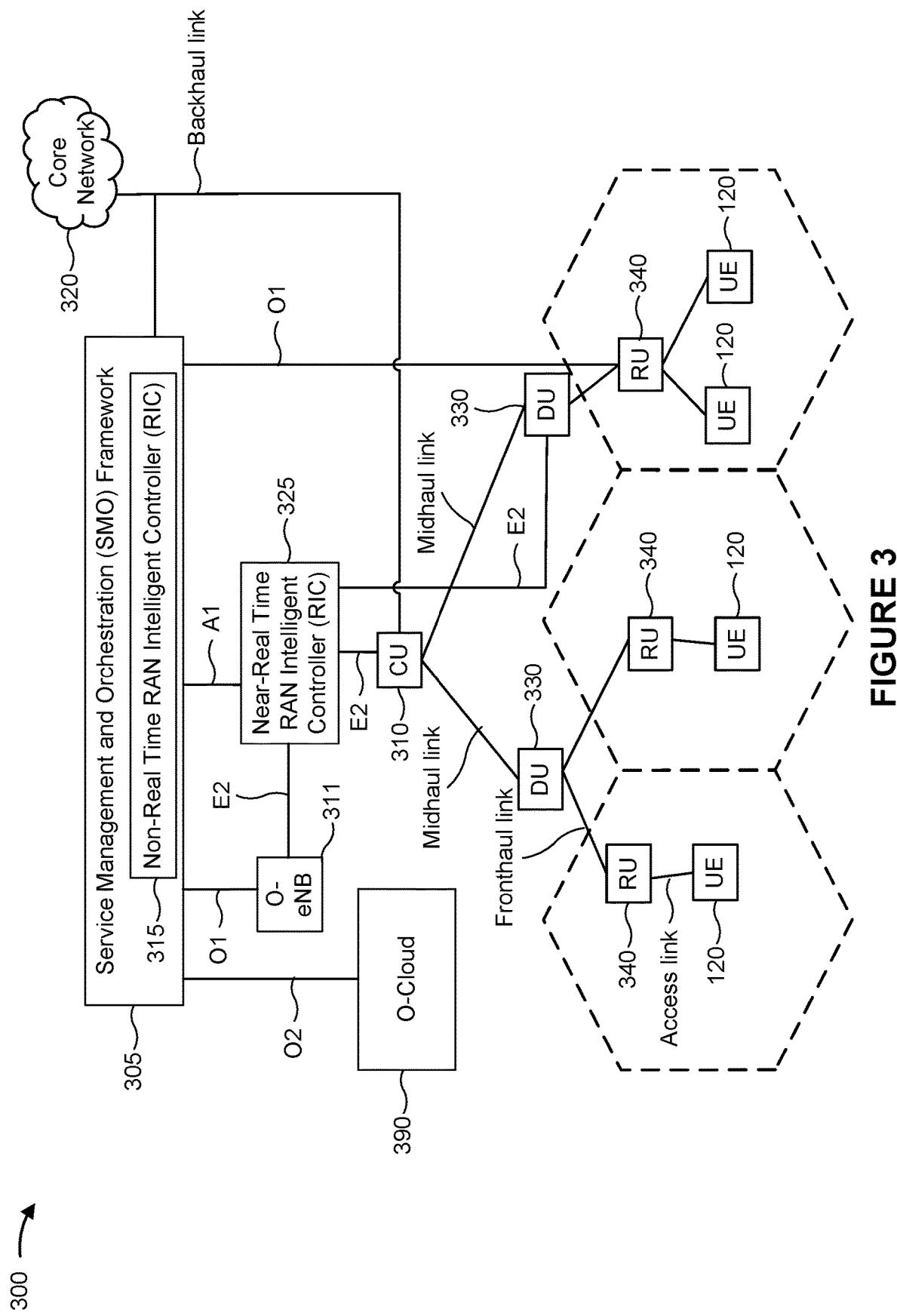
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT MC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
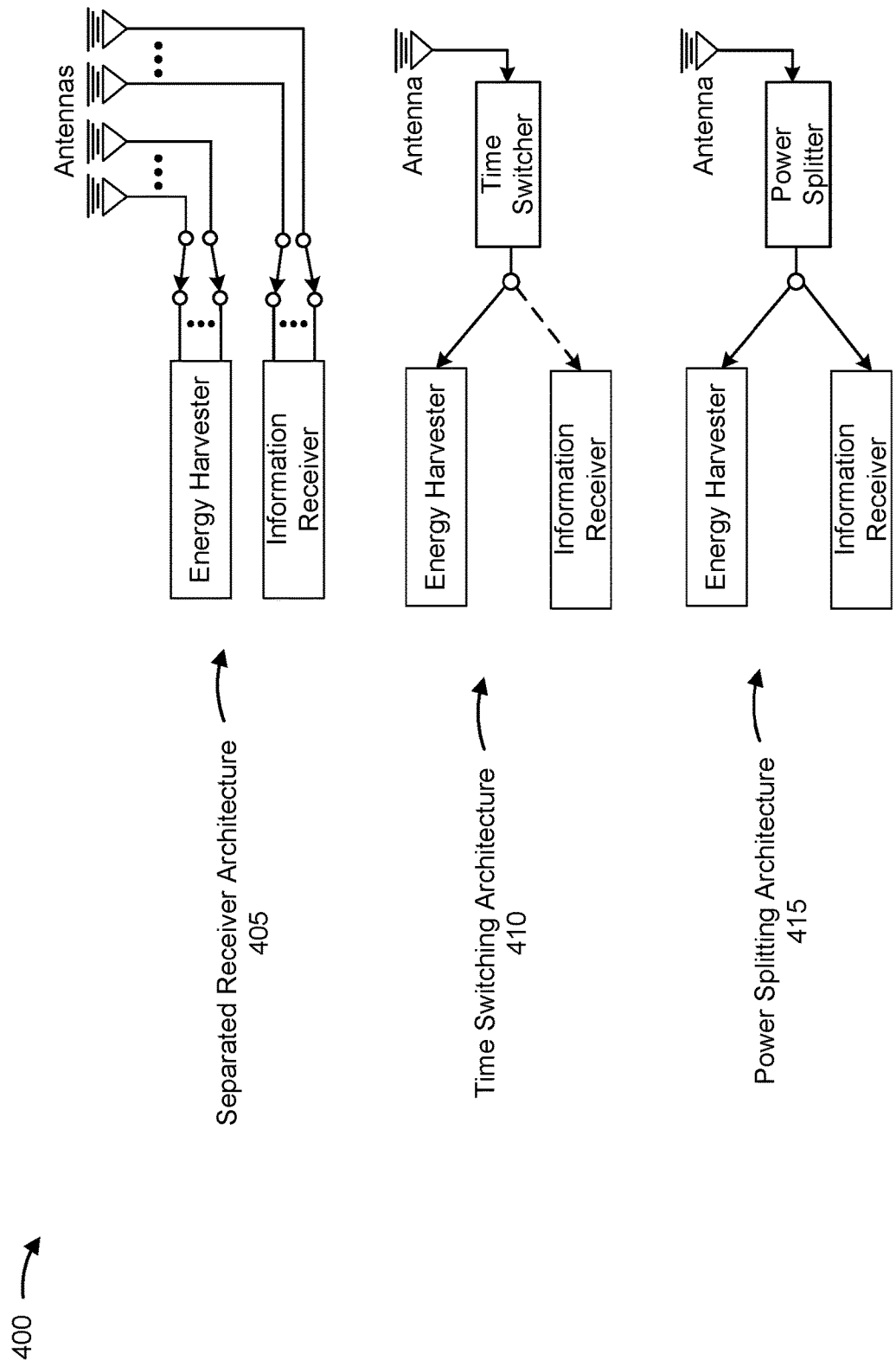
FIG. 4 is a diagram illustrating an example of energy harvesting, in accordance with the present disclosure.

FIG. 4 is a diagram illustrating an example 400 of energy harvesting, in accordance with the present disclosure. Energy harvesting (EH) includes obtaining energy from a source other than an on-device energy storage device (for example, a battery or a capacitor, among other examples). EH may be used to supplement energy obtained from an on-device energy storage device or may provide charging to the on-device energy storage device.

Devices that use EH ("energy harvesting device" or "EH device") may have a low-capacity energy storage device (for example, smart watch) or no energy storage device (for example, zero power devices, IoT devices, wearables, or financial devices). EH may include converting RF energy transferred from another device. Harvesting RF energy may not provide sufficient energy to fully charge an energy storage device but may be used for performing tasks such as data decoding, operating filters, data reception, data encoding, data reception, or data transmission, among other examples. The EH device may accumulate harvested energy over time (for example, in an on-device energy storage device) to use in a subsequent operation. EH may also be a part of self-sustainable networks, where an EH device in the network may communicate within the network using energy harvested from transmissions of other devices in the network.

As shown in FIG. 4, an EH device (for example, an RF receiver or a UE 120, among other examples) may receive signals (for example, radio signals carried on radio waves) from a donor device (for example, a transmitting device, an RF transmitter, a charging device, a network node 110, or a donor UE 120, among other examples) and convert electromagnetic energy of the signals (for example, using a rectenna including a dipole antenna with an RF diode) into direct current electricity for use by the EH device. The EH device may be a low power device or a zero power device, among other examples.

In some examples, the EH device may use a separated receiver architecture 405, where a first set of antennas is configured to harvest energy, and a second set of antennas is configured to receive data. In such examples, each set of antennas may be separately configured to receive signals at certain times, frequencies, or via one or more particular beams, such that all signals received by the first set of antennas are harvested for energy, and all signals received by the second set of antennas are processed or decoded to receive information or other communications.

In some examples, the EH device may use a time switching architecture 410 to harvest energy. The time switching architecture 410 may use one or more antennas to receive signals, and whether the signals are harvested for energy or processed to receive information depends on the time at which the EH device receives the signals. For example, one or more first time slots may be time slots during which received signals are sent to one or more EH components to harvest energy, and one or more second time slots may be time slots during which received signals are processed and decoded to receive information. In some examples, the time slots may be pre-configured (for example, by the EH device, the donor device, or another device).

In some examples, the EH device may use a power splitting architecture 415 to harvest energy. The power splitting architecture may use one or more antennas to receive signals, and the signals are handled by one or both of the EH or information receiving components according to an EH rate. For example, the EH device may be configured to use a first portion of received signals for EH and the remaining received signals for information receiving. In some examples, the EH rate may be pre-configured (for example, by the EH device, the donor device, or another device).

The EH device may receive signals for EH on certain resources (for example, time, frequency, or spatial resources) and at a certain power level that results in a particular charging rate. Energy harvested by the EH device may be used or stored for later use. For example, in some examples, the EH device may be powered directly by the harvested energy. In some examples, the EH device may use an energy storage device, such as a battery, capacitor, or supercapacitor, to gather and store harvested energy for immediate or later use.

Figure 5:
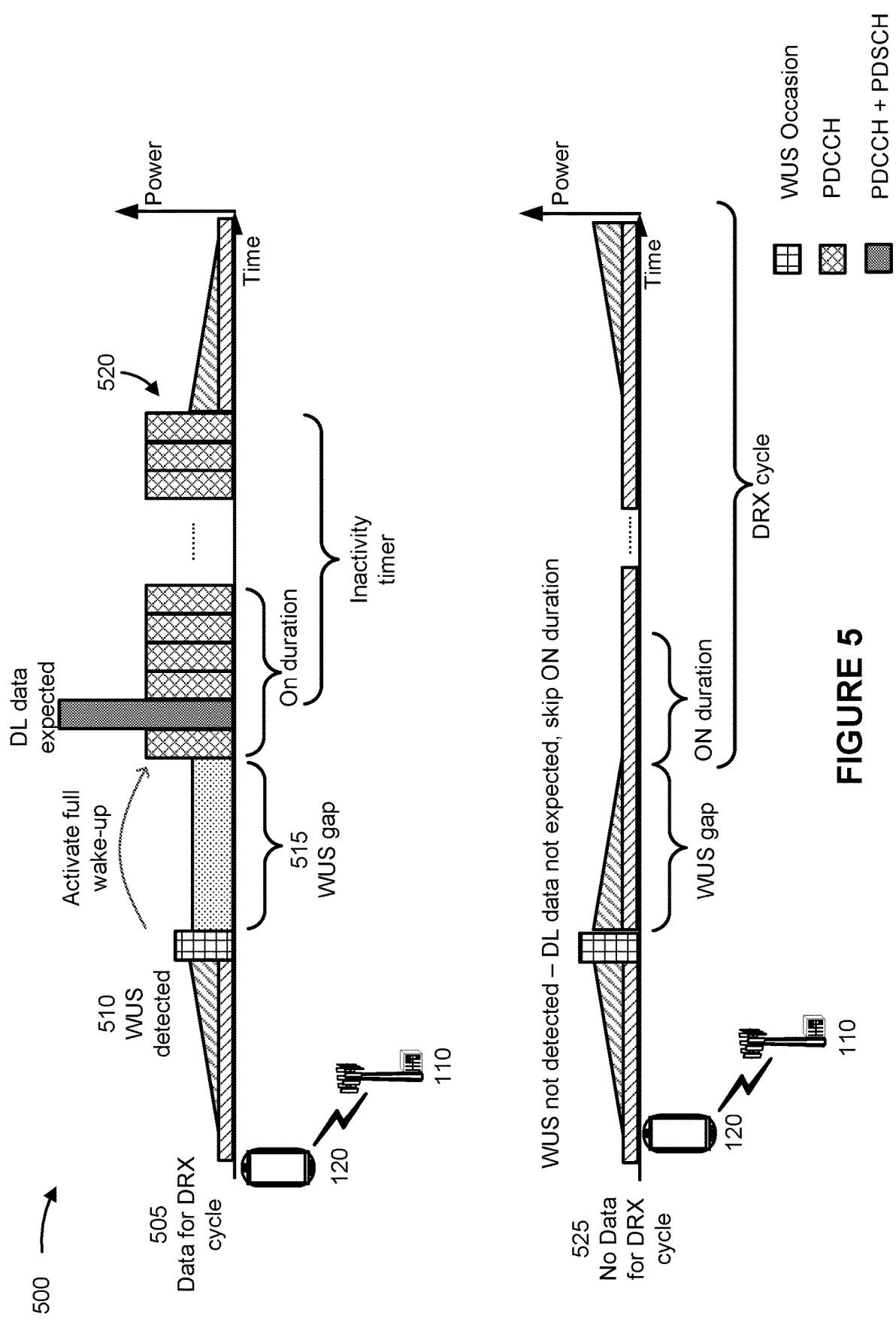
FIG. 5 is a diagram illustrating an example of wakeup signaling, in accordance with the present disclosure.

FIG. 5 is a diagram illustrating an example 500 of wakeup signaling, in accordance with the present disclosure. As shown in FIG. 5, example 500 includes a UE 120 in communication with a network node 110. In some cases, wakeup signaling in connection with a discontinuous reception (DRX) cycle may be referred to as "DRX adaptation."

Various techniques have been introduced for transitioning a transceiver out of a power-saving mode (for example, a sleep mode or a sleep state) and into an active mode. One technique includes transmitting a signal to the UE 120, which may indicate whether the UE 120 is to monitor an upcoming (or a next) on duration associated with a DRX cycle. The signal may be referred to as a WUS. The UE may temporarily transition out of the power-saving mode (for example, by activating one or more modules or components, such as the baseband processor) to monitor a physical downlink control channel (PDCCH) for the WUS during a WUS occasion. The UE 120 may use a relatively simple circuit to process the WUS, rather than powering on the associated modem or other components. In some examples, the UE 120 may monitor an on duration based on receiving a WUS from the network node 110. For example, if the UE 120 receives a WUS that indicates that the UE 120 is to monitor the subsequent on duration (or fails to decode a WUS in a WUS occasion in some cases), then the UE 120 may transition to the awake or active state and may monitor the PDCCH for downlink control information (DCI) pertaining to the UE 120. If the UE 120 receives a WUS that indicates that the UE 120 is not to monitor the subsequent on duration, then the UE 120 may enter a sleep state and may refrain from monitoring the PDCCH during the subsequent on duration. The WUS may enable the network node 110 to conserve resources for the UE 120 by enabling the network node 110 to indicate to the UE 120 when there will be traffic in an upcoming on duration and enabling the UE 120 to refrain from monitoring the on duration if there is no traffic to be communicated during the on duration. Accordingly, the network node 110 may use the WUS to increase the efficiency and power-saving of DRX operation by reducing the quantity of times that the UE 120 transitions to the active state.

The WUS may be transmitted via DCI (such as via a DCI using a DCI format 2_6, as defined by a wireless communication standard, such as the 3GPP) or other signaling. In some cases, the UE 120 may monitor time domain resources or frequency domain resources (which may be referred to as a "WUS occasion") in which the network node 110 may transmit a DCI communication that includes the WUS. In some cases, the network node 110 may configure the UE 120 to periodically monitor WUS occasions for a WUS. The network node 110 may configure a WUS occasion to occur at an offset duration prior to a DRX on duration. The amount of time associated with the offset may be configured such that there is sufficient time between receiving the WUS and the DRX on duration for the UE 120 to transition from a sleep state to an active state.

As shown in FIG. 5, in a first scenario 505 a downlink grant may be provided for UE 120. For example, the network node 110 may determine that a downlink grant is to be provided to UE 120 during a first DRX cycle period to enable the UE 120 to receive queued data from the network node 110 during the DRX cycle period. The UE 120 may detect a WUS 510 during a WUS occasion. In some examples, the WUS 510 may be transmitted by the network node 110 to wake up the UE 120 so that the UE 120 can receive a data transmission. In some examples, the WUS 510 may include a dedicated PDCCH communication transmitted by the network node 110 before a DRX on duration to indicate whether the UE 120 should monitor the next DRX on duration.

In some examples, the WUS 510 may be associated with a two-stage wakeup procedure. In a first stage, the UE 120 may wake up to a first level for PDCCH-WUS detection. If a WUS is detected and indicates "wakeup", then the UE 120 may wake up to a second level for monitoring for scheduling and reception of data. The first level and the second level may correspond to power modes. For example, in some examples, the first level may be a low power mode and the second level may be a high power mode (for example, a higher power mode than the low power mode). In some examples, during the first stage, low power mode, a minimal set of hardware may be instantiated or activated for PDCCH-only processing, the operating point in terms of voltage levels and clock frequencies of the hardware may be optimized, a more relaxed PDCCH processing timeline may be implemented, a receive bandwidth may be reduced, or a quantity of candidates or aggregation levels for PDCCH may be reduced, among other examples.

As shown, the UE 120 may take an amount of time to ramp up from a first level of power consumption for PDCCH-WUS detection to a second level of power consumption for monitoring for scheduling and reception of data. A WUS gap 515 may be configured as an amount of time between a WUS occasion and an on duration associated with the DRX cycle. In some examples, a WUS occasion may be only a few symbols long. In some examples, the UE 120 may ramp up according to a warm-up time. The WUS gap may be associated with a minimum warm-up threshold corresponding to the UE 120.

In some examples, an inactivity timer associated with a DRX sleep mode may be triggered based at least in part on not decoding any grant from PDCCH reception. Based at least in part on expiration of an inactivity timer, the UE 120 may transition to DRX sleep mode 520.

In a second scenario 525, a WUS may not be detected by the UE 120. For example, the network node 110 may determine that a downlink grant is not to be provided to the UE 120 during a second DRX cycle period (for example, based at least in part on the network node 110 not having data queued for transmission to UE 120) and may not provide a WUS to wake up the UE 120, or the network node 110 may transmit a WUS indicating that the UE 120 is not to monitor the downlink channel during a subsequent on duration. As shown, the UE 120 may monitor a downlink channel to receive a WUS and may fail to receive a WUS, or the UE 120 may decode the WUS as "no wakeup." Therefore, as shown in FIG. 5, the UE 120 may not power on a main radio or main receiver during a next on duration associated with the DRX cycle.

Figure 6:
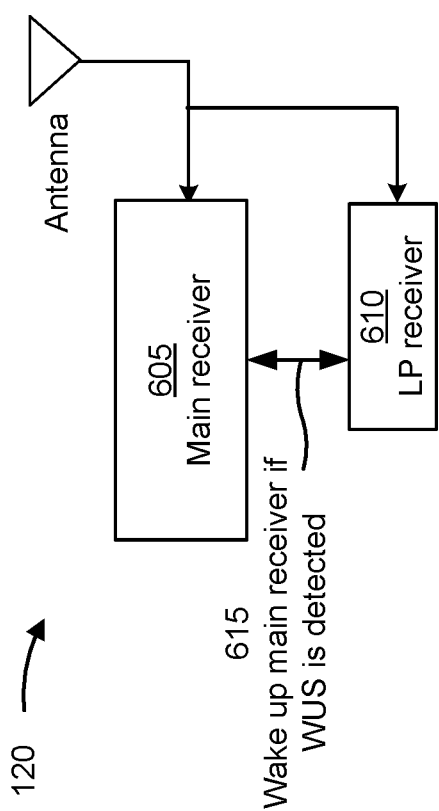
FIG. 6 is a diagram illustrating an example architecture of a UE associated with wakeup signaling, in accordance with the present disclosure.

FIG. 6 is a diagram illustrating an example architecture of a UE 120 associated with wakeup signaling, in accordance with the present disclosure. As shown in FIG. 6, the UE 120 may be associated with a main receiver 605 and a low power (LP) receiver 610. As used herein, a "receiver" may also be referred to as a receiver component, a radio, a receiver module, or a receiver chain, among other examples. A receiver may include one or more hardware components, one or more software components, or a combination of hardware components and software components. For example, a receiver may include receiver circuitry, a radio frequency chain, or one or more software modules. For example, the main receiver 605 and the LP receiver 610 may include separate receiver circuitry, radio frequency chains, or software modules.

The main receiver 605 may be include one or more components associated with transmitting or receiving data (for example, uplink data or downlink data). The LP receiver 610 may include a wakeup receiver (for example, a receiver used to receive paging or wakeup signaling while the UE 120 is in a sleep mode). For example, the LP receiver 610 may also be referred to as a low-complexity receiver, a wakeup receiver (WUR), or a low power WUR, among other examples. In some examples, the LP receiver 610 may not include one or more components that are included in the main receiver 605. For example, the LP receiver 610 may not include a mixer, an analog-digital converter (ADC), or a digital-analog converter (DAC), among other examples, which may eliminate the need for down-conversion to the intermediate frequency or baseband. In some examples, the LP receiver 610 may not perform demodulation. The main receiver 605 may include a modem or an entire communication chain (for example, any combination of antenna 252, modem 254, MIMO detector 256, receive processor 258, or controller/processor 280, among other examples), among other examples. In some examples, the LP receiver 610 and the main receiver 605 may be powered separately.

Because the LP receiver 610 may include lower complexity or fewer components (for example, as compared to the main receiver 605), the UE 120 may conserve power by monitoring for certain signals using the LP receiver 610 (for example, rather than the main receiver 605). For example, the UE 120 may monitor or receive wakeup signaling using the LP receiver 610 while the UE 120 is in a sleep state. This may enable the UE 120 to conserve a total power consumption by the UE 120 while also meeting latency requirements by frequently monitoring wakeup signaling from a network node 110 while the main receiver 605 is in a power sleep state. For example, because the LP receiver 610 consumes a small amount of energy, the UE 120 may monitor for wakeup signaling more frequently, thereby reducing latency associated with data communications communicated via the main receiver 605 (for example, because the UE 120 may be enabled to detect a WUS quicker via the LP receiver 610 and wake up the main receiver 605 with a reduced delay).

For example, in a first operation 615, the UE 120 may detect a WUS via the LP receiver 610. The UE 120 may perform an action to wake up the main receiver 605 based on detecting the WUS. For example, a modem or other component may transmit a signal (for example, internally to the UE 120) to cause the main receiver 605 to transition from the sleep state to an active state or on state. The UE 120 may transmit or receive data communications via the main receiver 605 based on waking up the main receiver 605. However, currently, the LP receiver 610 may only detect or receive a WUS that indicates whether the UE 120 is to transmit or receive data (for example, that indicates whether the main receiver 605 is to transition to an active state or an on state). For example, the WUS may be a binary signal (such as "wake up" or "no wake up"). For example, the UE 120 may need to communicate using the main receiver 605 to obtain additional information associated with the network, such as mobility information, among other examples. This consumes additional power of the UE 120 associated with waking up and communicating via the main receiver 605. In some examples, a WUS may indicate that the UE 120 is to receive or communicate data. However, in some cases (such as when the UE 120 is an EH device), the UE 120 may be unable to receive or decode the data due to a size of the data. As a result, the UE 120 may transition the main receiver 605 to the active state to attempt to receive the data, but may not be capable of decoding or receiving the data, thereby needlessly consuming power associated with transitioning the main receiver 605 into the active state.

Various aspects relate generally to information indicated by a low power WUS (for example, a WUS received via an LP receiver component, such as the LP receiver 610). Some aspects more specifically relate to including information in a WUS in addition to an indication of whether the UE 120 is to transmit or receive data. For example, in some aspects, the UE 120 may receive, via a first receiver component (such as an LP receiver), a WUS or a reference signal indicating information including cell barring information, downlink buffer status report information, or an indication to monitor a synchronization signal, among other examples. The UE 120 may communicate, via a second receiver component (for example, a main receiver, such as the main receiver 605), one or more signals based at least in part on the information included in the WUS or the reference signal.

For example, a WUS, received via the first receiver component of the UE 120, may indicate cell barring information indicating whether the UE 120 is barred from establishing a connection with a given cell. If the WUS indicates that the UE 120 is barred from establishing a connection with a given cell, then the UE 120 may transition a second receiver component (for example, a main receiver) from a sleep state to an active state to perform a cell search procedure. As another example, a WUS, received via the first receiver component of the UE 120, may indicate a size of a downlink communication to be received by the UE 120 (for example, via the downlink buffer status report information). The UE 120 may determine whether the UE 120 is capable of receiving a downlink communication having the size (for example, based at least in part on an energy harvesting class associated with the UE 120, an energy state associated with the UE 120, or a charging rate associated with the UE 120, among other examples). The UE 120 may selectively activate the second receiver component (for example, the main receiver) based at least in part on whether the UE 120 is capable of receiving a downlink communication having the size.

Particular aspects of the subject matter described in this disclosure can be implemented to realize one or more of the following potential advantages. In some examples, the described techniques can be used to improve wakeup operations performed by a UE 120 by providing additional information to the UE 120 to facilitate wakeup determinations. As a result, the UE 120 may conserve power by enabling the UE 120 to maintain a sleep state (for example, when the UE 120 is unable to receive a downlink communication intended for the UE 120, such as due to the size of the downlink communication). Additionally, communication performance of the UE 120 may be improved by enabling the UE 120 to reduce a latency associated with performing cell search procedures or by enabling the UE 120 to perform synchronization operations (such as by waking up to receive and decode a synchronization signal block (SSB)), among other examples.

Figure 7:
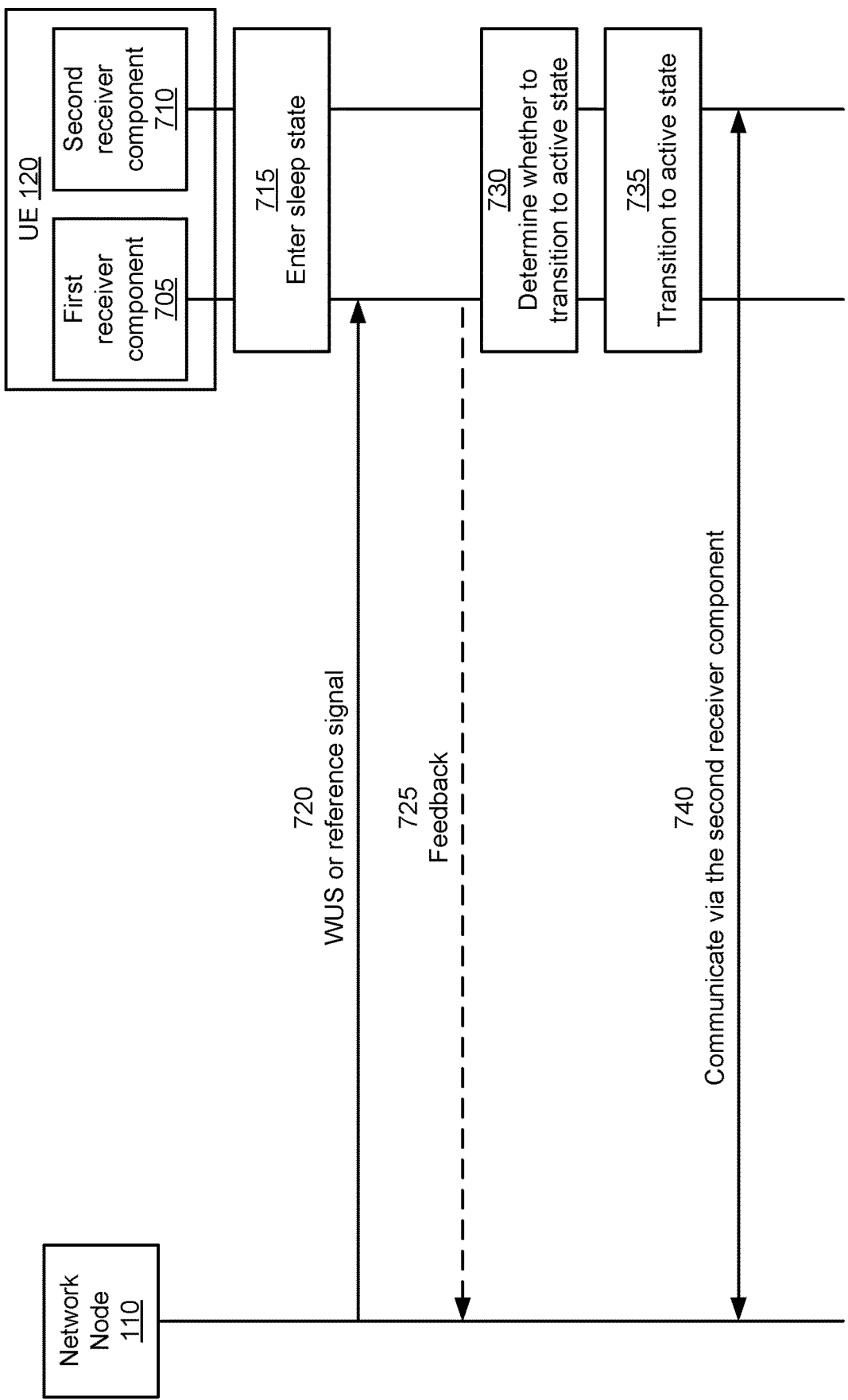
FIG. 7 is a diagram of an example associated with information indicated by a low power wakeup signal (WUS), in accordance with the present disclosure.

FIG. 7 is a diagram of an example associated with information indicated by a low power WUS, in accordance with the present disclosure. As shown in FIG. 7, a network node 110 (for example, a base station, a CU, a DU, an RU, or another network node) may communicate with a UE (for example, the UE 120). In some aspects, the network node 110 and the UE 120 may be part of a wireless network (for example, the wireless network 100). The UE 120 and the network node 110 may have established a wireless connection prior to operations shown in FIG. 7. In some aspects, the UE 120 may be an EH device (for example, in a similar manner as described in connection with FIG. 4).

As shown in FIG. 7, the UE 120 may include a first receiver component 705 and a second receiver component 710. The first receiver component 705 and the second receiver component 710 may include one or more hardware components, one or more software components, or a combination of hardware components and software components. For example, a receiver may include receiver circuitry, a radio frequency chain, or one or more software modules, among other examples. For example, the first receiver component 705 and the second receiver component 710 may include separate receiver circuitry, radio frequency chains, or software modules, among other examples. In some aspects, the first receiver component 705 may be a low power receiver component or a low complexity receiver component (for example, similar to the LP receiver 610). The second receiver component 710 may be a main receiver component or a primary receiver component (for example, similar to the main receiver 605). In some aspects, the first receiver component 705 and the second receiver component 710 may share one or more common RF front end components, such as an antenna or one or more amplifiers, among other examples. In some aspects, the first receiver component 705 and the second receiver component 710 may be associated with different RF front end components (for example, different antennas or different RF chains, among other examples). In some aspects, the first receiver component 705 may include a subset of components associated with the reception component 1002 depicted in FIG. 10. The second receiver component 710 may include, or may be, the reception component 1002 depicted in FIG. 10.

The first receiver component 705 may use less total power of the UE 120 to operate as compared to the second receiver component 710 (for example, due to the lower complexity or fewer components associated with the first receiver component 705). For example, the first receiver component 705 may be associated with a first power consumption level and the second receiver component 710 may be associated with a second power consumption level, where the second power consumption level is greater than the first power consumption level. In some aspects, the first receiver component 705 and the second receiver component 710 may be transceivers.

In some aspects, the network node 110 may transmit (for example, to the UE 120 or to another network node) configuration information intended for the UE 120. The UE 120 may receive (for example, from the network node 110 or from another network node) the configuration information. In some aspects, the UE 120 may receive the configuration information via one or more of RRC signaling, one or more MAC control elements (MAC-CEs), or downlink control information (DCI), among other examples. In some aspects, the configuration information may include an indication of one or more configuration parameters (for example, already known by or stored by the UE 120 or previously indicated by the network node 110 or other network device) for selection by the UE 120, or explicit configuration information for the UE 120 to use to configure itself, among other examples. In some aspects, the UE 120 may receive the configuration information via the second receiver component 710.

In some aspects, the configuration information may indicate that the UE 120 is to receive a WUS or a reference signal via the first receiver component 705, as described in more detail elsewhere herein. For example, the configuration information may indicate that the UE 120 is to monitor for or receive WUSs or certain reference signals via the first receiver component 705. In some aspects, the configuration information may indicate one or more monitoring occasions (for example, time-frequency resources to be monitored via the first receiver component 705) associated with wakeup signaling or a transmission of certain reference signals. In some aspects, the configuration information may indicate information to be indicated by the WUS or the reference signal that is to be received by the UE 120 via the first receiver component 705. For example, the configuration information may indicate that the WUS or the reference signal is to carry information associated with cell barring information, downlink buffer status report information, or an indication to monitor a synchronization signal (for example, an SSB), among other examples (for example, as described in more detail elsewhere herein). In some aspects, the configuration information may indicate that the UE 120 is to transmit, via the first receiver component 705, feedback information associated with the WUS or the reference signal. In some aspects, the configuration information may indicate that the feedback information is to include uplink buffer status report information associated with the UE 120, as described in more detail elsewhere herein.

The UE 120 may configure itself based at least in part on the configuration information. In some aspects, the UE 120 may be configured to perform one or more operations described herein based at least in part on the configuration information.

In some aspects, the UE 120 may transmit (for example, to the network node 110 or to another network node) a capability report intended for the network node 110. The network node 110 may receive (for example, from the UE 120 or from another network node) the capability report associated with the UE 120. In some aspects, the capability report may indicate UE support for monitoring or receiving wakeup signaling or other signaling via a low power receiver component (for example, the first receiver component 705). For example, the capability report may indicate that the UE 120 is capable of monitoring or receiving wakeup signaling or other signaling via a low power receiver component (for example, the first receiver component 705), such as when the wakeup signaling or the other signaling includes enhanced information (for example, cell barring information, downlink buffer status report information, or an indication to monitor a synchronization signal, among other examples), as described in more detail elsewhere herein. In some aspects, the network node 110 may transmit the wakeup signaling or the other signaling including the enhanced information based at least in part on the UE 120 indicating that the UE 120 supports receiving the wakeup signaling or the other signaling including the enhanced information.

In a first operation 715, the UE 120 may enter a sleep state. For example, the first operation 715 may include the UE 120 transitioning the second receiver component 710 from an active state (for example, an "on" state) to a sleep state (for example, an inactive state). In some aspects, the first operation 715 may include the UE 120 transitioning to an RRC idle mode. For example, the UE 120 may support a connected communication mode (for example, an RRC active mode or an RRC connected mode), an idle communication mode (for example, an RRC idle mode), and an inactive communication mode (for example, an RRC inactive mode). The RRC inactive mode may functionally reside between the RRC active mode and the RRC idle mode. The UE 120 may transition between different modes based at least in part on various commands or communications received from one or more network nodes, such as the network node 110. For example, the UE 120 may transition from the RRC active mode or the RRC inactive mode to the RRC idle mode based at least in part on receiving an RRCRelease communication. As another example, the UE may transition from the RRC active mode to the RRC inactive mode based at least in part on receiving an RRCRelease with suspendConfig communication. As another example, the UE 120 may transition from the RRC idle mode to the RRC active mode based at least in part on receiving an RRCSetupRequest communication. As another example, the UE 120 may transition from the RRC inactive mode to the RRC active mode based at least in part on receiving an RRCResumeRequest communication.

For example, the first operation 715 may include the UE 120 transitioning to a power saving mode in which the first receiver component 705 is used to monitor for or receive communications (for example, rather than the second receiver component 710). As part of the first operation 715, one or more (or all) modules, components, or devices associated with the second receiver component 710 may be powered down (for example, to conserve power). In the sleep state or the power saving mode, modules, components, or devices associated with the first receiver component 705 may be powered on.

In a second operation 720, the network node 110 may transmit (for example, to the UE 120 or to another network node) a WUS or a reference signal intended for the UE 120. The UE 120 may receive (for example, from the network node 110 or from another network node) the WUS or the reference signal. The UE 120 may receive the WUS or the reference signal via the first receiver component 705. The WUS or the reference signal may include information (for example, enhanced information beyond an indication of whether the UE 120 is to wake up or remain in the sleep state). For example, the information may include cell barring information, downlink buffer status report information, or an indication to monitor a synchronization signal, among other examples. As described above, the second receiver component 710 may be in a sleep state when the WUS or the reference signal is received via the first receiver component 705 in the second operation 720. Additionally or alternatively, the UE 120 may be associated with an RRC idle mode when the WUS or the reference signal is received via the first receiver component 705 in the second operation 720.

In some aspects, in the second operation 720, the UE 120 may receive a WUS. The WUS may be a low power WUS. For example, the WUS may be associated with parameters (for example, transmit power, frequency domain density, time domain density, MCS, among other examples) that facilitate the WUS being received by the UE 120 via the first receiver component 705. For example, the first receiver component 705 may be associated with low data rates, poor reliability, or poor sensitivity, among other examples (for example, as compared to the second receiver component 710). The WUS may be designed to improve a reliability or latency associated with the UE 120 receiving the WUS via the first receiver component 705.

In some other aspects, in the second operation 720, the UE 120 may receive a reference signal. The reference signal may be a low power reference signal associated with mobility operations. For example, the reference signal may be different than an SSB. For example, an SSB may include resources that carry a primary synchronization signal (PSS), a secondary synchronization signal (SSS), or a physical broadcast channel (PBCH). In some aspects, multiple SSBs are included in an SS burst (for example, with transmission on different beams), and the PSS, the SSS, or the PBCH may be the same across each SSB of the SS burst. SSBs (for example, PSS/SSS) may be transmitted by a network node, such as the network node 110, periodically over time. An SSB may carry information used for initial network acquisition and synchronization. The reference signal received by the UE 120 as part of the second operation 720 may differ from an SSB in a time domain density associated with the reference signal. For example, the reference signal may be transmitted with a higher density in the time domain as compared to an SSB (for example, similar to a Resync reference signal associated with enhanced machine-type communications (eMTC) or LTE communications). Receiving the reference signal associated with mobility in the second operation 720 may enable the UE 120 to refrain from monitoring for or receiving SSBs (for example, via the second receiver component 710), thereby conserving power.

In some aspects, in the second operation 720, the UE 120 may receive an indication of whether a cell associated with the network node 110 is available to the UE 120 (for example, where the cell can be camped by the UE 120). In other words, the WUS or reference signal received by the UE 120 as part of the second operation 720 may include an indication of whether the UE 120 can establish a connection with a cell associated with the network node 110. For example, the WUS or the reference signal may include access barring or unified access control (UAC) information.

For example, in the second operation 720, the UE 120 may receive an indication of cell barring information. For example, the WUS or the reference signal may include information (for example, one or more bits) in the WUS or the reference signal indicating whether the UE 120 is barred from establishing a connection with a cell associated with the network node 110. For example, cell barring indications may typically be transmitted via a system information communication, such as a master information block (MIB). Cell barring information may include information (for example, a single bit) indicating a value of "barred" or "not barred." If the UE 120 receives an indication of "barred," then the UE 120 may not be permitted to select or reselect to the cell (for example, may not be permitted to establish a connection with the cell). Rather than, or in addition to, including the cell barring information in a MIB, the network node 110 may include cell barring information in the WUS or the reference signal to be received by the UE 120 as part of the second operation 720. This may enable the UE 120 to receive cell barring information or UAC information while in the RRC idle state and without using the second receiver component 710, thereby conserving power.

For example, in the second operation 720, the UE 120 may receive cell barring information indicating that the UE 120 is barred from establishing the connection with the cell or the network node 110. As described in more detail elsewhere herein (such as in connection with a fourth operation 730, a fifth operation 735, or a sixth operation 740), the UE 120 may perform, via the first receiver component 705, an action to cause the second receiver component 710 to transition from a sleep state to an active state based at least in part on the UE 120 being barred from establishing the connection with the cell. For example, the UE 120 may transmit, receive, or measure one or more signals associated with a cell search procedure based at least in part on the UE 120 being barred from establishing the connection with the cell. In other words, based at least in part on the UE 120 being barred from establishing the connection with the cell, the UE 120 may wake up the second receiver component 710 and perform a cell search procedure to identify a cell that the UE 120 can establish a connection with. Therefore, the network node 110 may indicate a barring bit to enable the UE 120 to know (for example, when using the first receiver component 705 in an RRC idle mode) if the UE 120 can access this cell and, if the UE 120 is barred from accessing the cell, to search for another suitable cell.

In some aspects, the cell barring information may be included in, or multiplexed with, a reference signal (for example, rather than being included in a WUS). For example, cell barring information (such as a cell barring bit) may be multiplexed to any reference signal used for mobility in the RRC idle mode. The cell barring information may be multiplexed with, or appended to, the reference signal. For example, the cell barring information may be multiplexed with a WUS, a low power reference signal (for example, a reference signal configured for the UE 120 to be received via the first receiver component 705 in the RRC idle mode, as described in more detail elsewhere herein), or another reference signal associated with mobility measurements (for example, received or measured by the first receiver component 705 or the second receiver component 710). In other words, in some cases, rather than including the cell barring information in a signal that is to be received or measured via the first receiver component 705, the cell barring information may be included in mobility reference signals that will be measured via the second receiver component 710.

A wireless network, such as an NR network, may consume a great amount of electrical power, with network nodes of the NR network consuming more than 20% of the power. A network node of the NR network may include multiple active antenna units (AAUs) to support NR communications, and the AAUs may consume 90% of the power used by the NR network node. An NR network node may consume more than 3 times the power consumed by an LTE base station, because the NR network node may operate in a higher band, over a larger bandwidth, and with more TRPs. High power consumption involves high operating expenses that reduce operator profits. Furthermore, high power consumption may impact the environment because electricity generation may increase carbon emissions.

In some aspects, the NR network may optimize power consumption as part of a green NR network. An NR network node (such as the network node 110), or at least a portion of the AAU of the network node 110, may sleep or wake up as needed in order to conserve resources. For example, the network node 110 may use 0-8 antenna ports, rather than 64 antenna ports, at certain times (such as when demand for network resources is typically low). To further reduce power, the network node 110 may transmit SSBs every 160 milliseconds rather than every 20 milliseconds. The network node 110 conserves power in sleep mode, and a cell associated with the network node 110 in a sleep mode may be referred to as a "dormant cell."

For example, the network node 110 may be associated with one or more network energy states. The network energy states may correspond to respective levels of network power optimization. For example, in a first network energy state, the network node may be capable of supporting a first quantity of UEs (for example, may operate using a first quantity of antennas), in a second network energy state, the network node may be capable of supporting a second quantity of UEs (for example, may operate using a second quantity of antennas), and so on. As another example, in a first network energy state, the network node 110 may not support one or more types of UEs or types of wireless communication devices. In a second network energy state, the network node 110 may support the one or more types of UEs or types of wireless communication devices. For example, in some cases, the wireless network 100 may include various relay devices or nodes (such as a radio frequency identification (RFID) device). The network node 110 may consume significant power resources to transmit signals intended for the relay devices. Therefore, in some cases, the network node 110 may not communicate with certain relay devices (for example, based at least in part on a priority level, an identifier, or data associated with the relay devices) when the network node 110 is operating in a given network energy state. In some aspects, the cell barring information may be based at least in part on a network energy state of the network node 110.

For example, the configuration information may indicate respective cell barring information associated with one or more network energy states. For example, the cell barring information may indicate a quantity of UEs, a type of UE, a priority level, or other devices that are supported or are barred when the network node 110 is operating in a given network energy state. In some aspects, the information included in the WUS or the reference signal (for example, received by the UE 120 in the second operation 720) may include an indication of a network energy state, from the one or more network energy states. The cell barring information may be indicated by the configuration information and the network energy state indicated by the WUS or the reference signal. For example, the UE 120 may determine whether the UE 120 is barred from accessing the cell or the network node 110 based at least in part on the current network energy state of the network node 110 and on the association of cell barring information to network energy states configured for the UE 120. For example, a given network energy state may bar a given relay device type (for example, RFID devices). If the UE 120 uses the given relay device type to access the cell, then the UE 120 may identify that the UE 120 is barred from accessing the cell.

As another example, the network node 110 may transmit an indication of the cell barring information (for example, in the second operation 720) based at least in part on the network node 110 transitioning to a different network energy state. For example, the cell barring information may be indicated (for example, in the second operation 720) via at least one of a Layer 1 signal, a Layer 2 signal, or a Layer 3 signal to indicate barring of the UE 120 or the set of UEs 120 when the network node 110 transitions to a new network energy state.

In some aspects, in the second operation 720, the UE 120 may receive downlink buffer status report information. The downlink buffer status report information may indicate a size associated with downlink data intended for the UE 120. For example, the downlink buffer status report information may indicate a quantity of bits, via a quantization level, associated with downlink data intended for the UE 120. For example, the WUS or the reference signal received by the UE 120 in the second operation 720 may include one or more bits to indicate a size of the downlink data intended for the UE 120. For example, a quantization level may be a 1 level quantization (for example, the downlink buffer status report information may indicate that the downlink data is greater than or less than Y bits). As another example, the quantization level may be a 2 level quantization (for example, the downlink buffer status report information may indicate that the downlink data is less than Z bits, between Z bits and Mbits, or greater than Mbits).

Using greater granularity or a lower quantization level may enable a size of the downlink buffer status report information to be smaller, while still providing an indication to the UE 120 of the size of the downlink data that is intended for the UE 120. For example, the network node 110 may obtain downlink data that is intended for the UE 120. The network node 110 may determine a size of the downlink data. The network node 110 may transmit a WUS or reference signal intended for the UE 120 indicating that the UE 120 is to wake up to receive the downlink data (for example, via the second receiver component 710). The network node 110 may indicate, via the downlink buffer status report information included in the WUS or reference signal, a relative size of the downlink data (for example, less than or equal to Y bits or greater than Y bits). For example, assuming Y is 100 bits and the downlink data is associated with a size of 300 bits, then the downlink buffer status report information may indicate that the downlink data intended for the UE 120 has a size greater than 100 bits. While the UE 120 may not receive an exact size of the downlink data, the relative indication of the size of the downlink data may enable the UE 120 to make improved wakeup determinations.

For example, the UE 120 may be a power limited device, such as an energy harvesting device. In such examples, the UE 120 may have insufficient power to decode downlink data that is greater than a given size. Therefore, the downlink buffer status report information may enable the UE 120 to ignore the wakeup indication and refrain from waking up the second receiver component 710 (for example, in the fourth operation 730) if the downlink buffer status report information indicates that the UE 120 will be unable to decode the downlink data due to the size of the downlink data. This may conserve power of the UE 120 that would have otherwise been used by the UE 120 to wake up the second receiver component 710 and attempt (for example, unsuccessfully) to decode the downlink data. For example, the UE 120 may perform, via the first receiver component 705, an action to cause the second receiver component 710 to transition from the sleep state to an active state based at least in part on a quantity of bits indicated by the downlink buffer status report information satisfying a threshold. In some aspects, the quantization level (used to indicate the size of the downlink data) or the threshold is based at least in part on an energy harvesting class associated with the UE 120, an energy state associated with the UE 120, or a charging rate associated with the UE 120, among other examples.

In some aspects, the WUS or reference signal (for example, received by the UE 120 in the second operation 720) may include an indication that the UE 120 is to monitor a synchronization signal, such as an SSB. For example, the WUS or reference signal received via the first receiver component 705 may indicate that the UE 120 is to monitor for or decode an SSB after waking up the second receiver component 710. For example, this may enable the UE 120 to quickly receive or measure an SSB after waking up the second receiver component 710 for further synchronization, reduce error rate, or to detect a change of system information, among other examples.

In some aspects, the WUS or reference signal (for example, received by the UE 120 in the second operation 720) may include an indication that the UE 120 is to monitor a synchronization signal via the first receiver 705. For example, the WUS or reference signal may indicate that the UE 120 is to monitor for, or decode, an SSB or another synchronization signal using the first receiver component 705 prior to waking up the second receiver component 710. This may enable the UE 120 to perform synchronization operations or other operations without waking up the second receiver component 710, thereby conserving power.

In a third operation 725, the UE 120 may transmit, via the first receiver component 705, a feedback communication in response to the WUS or the reference signal (for example, that is received in the second operation 720). The network node 110 may receive the feedback communication in response to the WUS or the reference signal. The feedback communication may be a low power transmission (for example, having a transmit power less than a power threshold or being designed to be transmitted via the first receiver component 705). For example, the feedback communication may be a low power WUS feedback communication. The feedback communication may indicate whether the WUS or the reference signal (for example, that is received in the second operation 720) was successfully received by the UE 120.

In some aspects, the feedback communication may indicate uplink buffer status report information associated with uplink data to be transmitted via the second receiver component 710. This may enable the network node 110 to determine a quantity of resources needed for the UE 120 to transmit the uplink data. For example, this may enable the network node 110 to quickly determine or allocate the resources to the UE 120 for the uplink data, reducing a latency associated with the uplink data. Additionally, the uplink buffer status report information may enable the network node 110 to compute an energy model for the UE 120 (for example, tracking or determining consumed energy by UE 120), such as when the UE 120 is an EH device.

As another example, the feedback communication may indicate whether the UE 120 is able to receive a downlink communication having a size indicated by the downlink buffer status report information. For example, the feedback communication may indicate whether the UE 120 can handle a downlink communication that is intended for the UE 120, as indicated by the WUS or the reference signal received by the UE 120 in the second operation 720.

In the fourth operation 730, the UE 120 may determine whether to transition the second receiver component 710 from the sleep state to an active state based at least in part on the information received in the second operation 720. For example, the UE 120 may determine whether to wake up the second receiver component 710 based at least in part on the information included in the WUS or the reference signal. For example, if the WUS or the reference signal indicates that the UE 120 is barred from a cell associated with the network node 110, then the UE 120 may determine to wake up the second receiver component 710 to perform a cell search procedure. As another example, the UE 120 may determine whether to wake up the second receiver component 710 based at least in part on a size of downlink data to be received by the UE 120. For example, if the size of the downlink data, as indicated by the downlink buffer status report information, satisfies a threshold, then the UE 120 may determine to transition the second receiver component 710 from the sleep state to the active state. Alternatively, if the size of the downlink data as indicated by the downlink buffer status report information does not satisfy the threshold, then the UE 120 may determine to keep the second receiver component 710 in the sleep state and refrain from receiving the downlink data. If the UE 120 determines that the second receiver component 710 is to stay in the sleep state (for example, and not wake up), then the UE 120 may not perform the fifth operation 735 or the sixth operation 740, as described below.

In the fifth operation 735, the UE 120 may perform one or more actions to cause the second receiver component 710 to transition to the active state (for example, based at least in part on determining to wake up the second receiver component 710 in the fourth operation 730). For example, the UE 120 may perform, via the first receiver component 705, an action to cause the second receiver component 710 to transition from a sleep state to an active state. For example, the action may include transmitting a signal (for example, internally to the UE 120) to another component of the UE 120 by the first receiver component 705 or a modem of the UE 120 to cause the second receiver component 710 to transition from a sleep state to an active state. For example, a configuration indicator or flag may be changed, modified, or triggered as part of performing the action (for example, by the first receiver component 705 or another component of the UE 120). The UE 120, based at least in part on detecting that the configuration indicator or flag has been changed, modified, or triggered, may cause the second receiver component 710 to wake up.

In some aspects, the UE 120 may wake up the second receiver component in accordance with a timing schedule (for example, as indicated by the configuration information). For example, the UE 120 may perform an action to cause the second receiver component to transition from a sleep state to an active state based at least in part on the information included in the WUS or the reference signal, where a timing at which the second receiver component transitions to the active state is based at least in part on a last symbol associated with the WUS or the reference signal, a last symbol of a feedback communication transmitted by the UE in response to the WUS or the reference signal, or a first downlink control channel monitoring occasion that is at least an amount of time (for example, $T_{min}$) from the last symbol associated with the WUS or the reference signal, among other examples. For example, a timing at which the UE 120 is to wake up the second receiver component 710 may be defined with respect to the last symbol associated with wakeup signaling reception (for example, as received in the second operation 720). As another example, the timing at which the UE 120 is to wake up the second receiver component 710 may be defined with respect to the last symbol in which the UE 120 transmits WUS feedback (for example, in the third operation 725). As another example, the timing at which the UE 120 is to wake up the second receiver component 710 may be defined with respect to a first PDCCH occasion associated with the UE 120 monitoring the PDCCH using the second receiver component 710 that is at least $T_{min}$ symbols from the last symbol for WUS reception (for example, as received in the second operation 720). In some aspects, a value of $T_{min}$ may be based at least in part on a capability associated with the UE 120, an energy harvesting class associated with the UE 120, an energy state associated with the UE 120, or a charging rate associated with the UE 120, among other examples.

In the sixth operation 740, the UE 120 may communicate, via the second receiver component 710, one or more signals based at least in part on the information included in the WUS or the reference signal. For example, the UE 120 may communicate (for example, transmit or receive) the one or more signals based at least in part on waking up the second receiver component 710 (for example, in the fifth operation 735). For example, the UE 120 may receive one or more signals using the second receiver component 710. As another example, the UE 120 may transmit one or more signals using the second receiver component 710. In some aspects, the one or more signals are associated with a cell search procedure. In some aspects, the one or more signals may be associated with downlink data (for example, that is associated with the downlink buffer status report information). In some aspects, the one or more signals may be associated with an SSB.

As a result, the UE 120 and the network node 110 may perform improved wakeup operations by providing additional information to the UE 120 to facilitate wakeup determinations. As a result, the UE 120 may conserve power by enabling the UE 120 to maintain a sleep state (for example, when the UE 120 is unable to receive a downlink communication intended for the UE 120, such as due to the size of the downlink communication). Additionally, communication performance of the UE 120 may be improved by enabling the UE 120 to reduce a latency associated with performing cell search procedures or by enabling the UE 120 to perform synchronization operations (such as by waking up to receive and decode an SSB), among other examples.

Figure 8:
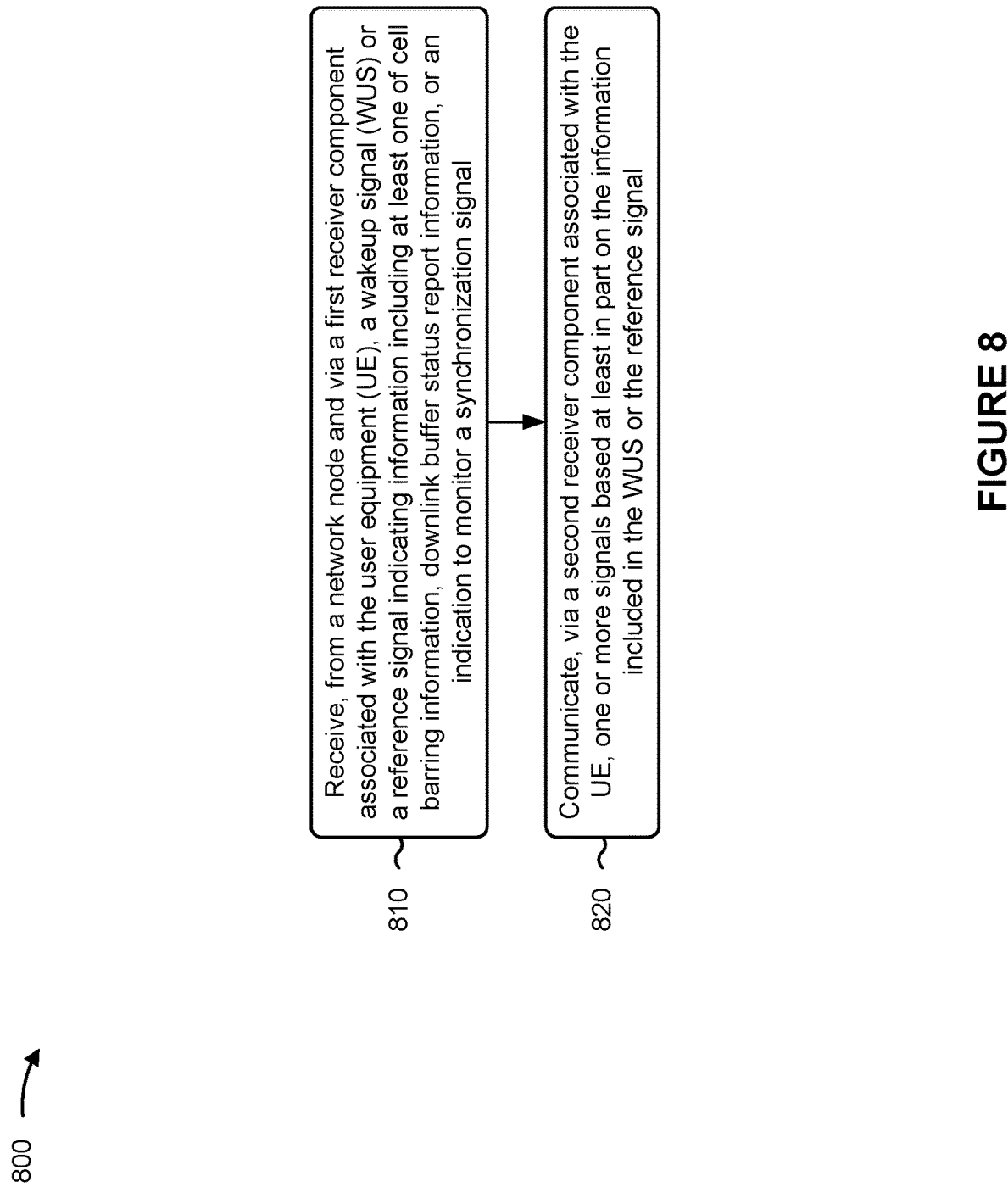
FIG. 8 is a flowchart illustrating an example process performed, for example, by a UE, associated with information indicated by a low power wakeup signal, in accordance with the present disclosure.

FIG. 8 is a flowchart illustrating an example process 800 performed, for example, by a UE, associated with information indicated by a low power wakeup signal, in accordance with the present disclosure. Example process 800 is an example where the UE (for example, UE 120) performs operations associated with information indicated by a low power wakeup signal.

As shown in FIG. 8, in some aspects, process 800 may include receiving, from a network node and via a first receiver component associated with the UE, a WUS or a reference signal indicating information including at least one of cell barring information, downlink buffer status report information, or an indication to monitor a synchronization signal (block 810). For example, the UE (such as by using communication manager 140 or reception component 1002, depicted in FIG. 10) may receive, from a network node and via a first receiver component associated with the UE, a WUS or a reference signal indicating information including at least one of cell barring information, downlink buffer status report information, or an indication to monitor a synchronization signal, as described above.

As further shown in FIG. 8, in some aspects, process 800 may include communicating, via a second receiver component associated with the UE, one or more signals based at least in part on the information included in the WUS or the reference signal (block 820). For example, the UE (such as by using communication manager 140, reception component 1002, or transmission component 1004, depicted in FIG. 10) may communicate, via a second receiver component associated with the UE, one or more signals based at least in part on the information included in the WUS or the reference signal, as described above.

Process 800 may include additional aspects, such as any single aspect or any combination of aspects described below or in connection with one or more other processes described elsewhere herein.

In a first additional aspect, the first receiver component is associated with a first power consumption level and the second receiver component is associated with a second power consumption level, and the second power consumption level is greater than the first power consumption level.

In a second additional aspect, alone or in combination with the first aspect, the second receiver component is in a sleep state when the WUS or the reference signal is received via the first receiver component.

In a third additional aspect, alone or in combination with one or more of the first and second aspects, the UE is associated with an RRC idle mode when the WUS or the reference signal is received via the first receiver component.

In a fourth additional aspect, alone or in combination with one or more of the first through third aspects, the cell barring information includes an indication of whether the UE is barred from establishing a connection with a cell associated with the network node.

In a fifth additional aspect, alone or in combination with one or more of the first through fourth aspects, the cell barring information indicates that the UE is barred from establishing the connection with the cell, and communicating the one or more signals includes performing an action to cause the second receiver component to transition from a sleep state to an active state based at least in part on the UE being barred from establishing the connection with the cell, and communicating, with one or more other network nodes and via the second receiver component, the one or more signals, where the one or more signals are associated with a cell search procedure.

In a sixth additional aspect, alone or in combination with one or more of the first through fifth aspects, the reference signal is associated with a mobility operation in an RRC idle mode, and the cell barring information is multiplexed with or appended to the reference signal.

In a seventh additional aspect, alone or in combination with one or more of the first through sixth aspects, process 800 includes receiving, from the network node, configuration information indicating respective cell barring information associated with one or more network energy states, where the information included in the WUS or the reference signal includes an indication of a network energy state, from the one or more network energy states, and where the cell barring information is indicated by the configuration information and the network energy state indicated by the WUS or the reference signal.

In an eighth additional aspect, alone or in combination with one or more of the first through seventh aspects, the cell barring information is based at least in part on a network energy state of the network node.

In a ninth additional aspect, alone or in combination with one or more of the first through eighth aspects, the cell barring information is indicated via at least one of a Layer 1 signal, a Layer 2 signal, or a Layer 3 signal.

In a tenth additional aspect, alone or in combination with one or more of the first through ninth aspects, the downlink buffer status report information indicates a quantity of bits, via a quantization level, associated with downlink data intended for the UE, and process 800 includes performing an action to cause the second receiver component to transition from a sleep state to an active state based at least in part on the quantity of bits satisfying a threshold.

In an eleventh additional aspect, alone or in combination with one or more of the first through tenth aspects, the UE is an energy harvesting device.

In a twelfth additional aspect, alone or in combination with one or more of the first through eleventh aspects, the quantization level or the threshold is based at least in part on at least one of an energy harvesting class associated with the UE, an energy state associated with the UE, or a charging rate associated with the UE.

In a thirteenth additional aspect, alone or in combination with one or more of the first through twelfth aspects, process 800 includes transmitting, via the first receiver component, a feedback communication in response to the WUS or the reference signal.

In a fourteenth additional aspect, alone or in combination with one or more of the first through thirteenth aspects, the feedback communication indicates uplink buffer status report information associated with uplink data to be transmitted via the second receiver component.

In a fifteenth additional aspect, alone or in combination with one or more of the first through fourteenth aspects, the feedback communication indicates whether the UE is able to receive a downlink communication having a size indicated by the downlink buffer status report information.

In a sixteenth additional aspect, alone or in combination with one or more of the first through fifteenth aspects, process 800 includes performing an action to cause the second receiver component to transition from a sleep state to an active state based at least in part on the information included in the WUS or the reference signal, where a timing at which the second receiver component transitions to the active state is based at least in part on at least one of a last symbol associated with the WUS or the reference signal, a last symbol of a feedback communication transmitted by the UE in response to the WUS or the reference signal, or a first downlink control channel monitoring occasion that is at least an amount of time from the last symbol associated with the WUS or the reference signal.

In a seventeenth additional aspect, alone or in combination with one or more of the first through sixteenth aspects, the amount of time is based at least in part on at least one of a capability associated with the UE, an energy harvesting class associated with the UE, an energy state associated with the UE, or a charging rate associated with the UE.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
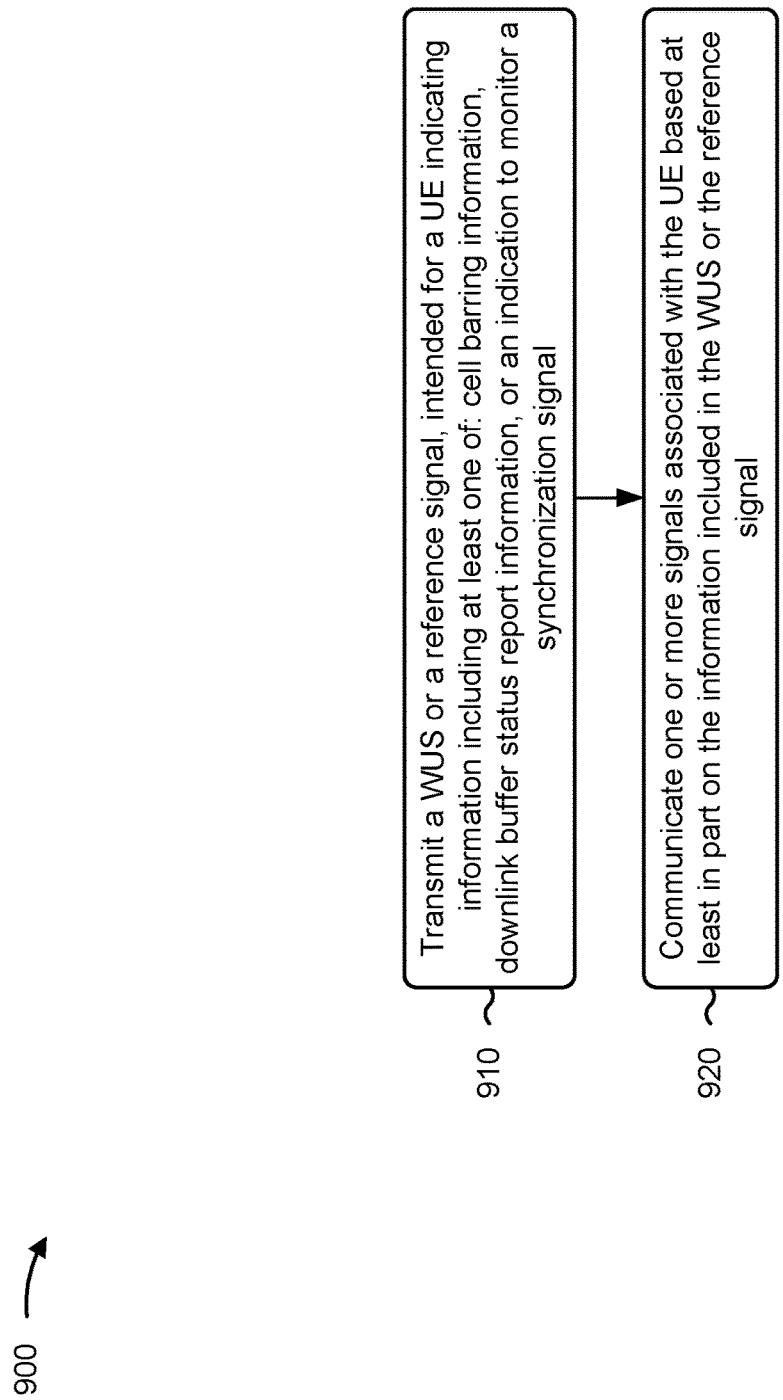
FIG. 9 is a flowchart illustrating an example process performed, for example, by a network node, associated with information indicated by a low power wakeup signal, in accordance with the present disclosure.

FIG. 9 is a flowchart illustrating an example process 900 performed, for example, by a network node, associated with information indicated by a low power wakeup signal, in accordance with the present disclosure. Example process 900 is an example where the network node (for example, the network node 110) performs operations associated with information indicated by a low power wakeup signal.

As shown in FIG. 9, in some aspects, process 900 may include transmitting a WUS or a reference signal, intended for a UE, indicating information including at least one of: cell barring information, downlink buffer status report information, or an indication to monitor a synchronization signal (block 910). For example, the network node (such as by using communication manager 150 or transmission component 1104, depicted in FIG. 11) may transmit a WUS or a reference signal, intended for a UE, indicating information including at least one of: cell barring information, downlink buffer status report information, or an indication to monitor a synchronization signal, as described above.

As further shown in FIG. 9, in some aspects, process 900 may include communicating one or more signals associated with the UE based at least in part on the information included in the WUS or the reference signal (block 920). For example, the network node (such as by using communication manager 150, reception component 1102, or transmission component 1104, depicted in FIG. 11) may communicate one or more signals associated with the UE based at least in part on the information included in the WUS or the reference signal, as described above.

Process 900 may include additional aspects, such as any single aspect or any combination of aspects described below or in connection with one or more other processes described elsewhere herein.

In a first additional aspect, the WUS or the reference signal is a low power signal.

In a second additional aspect, alone or in combination with the first aspect, the UE is associated with an RRC idle mode when the WUS or the reference signal is transmitted.

In a third additional aspect, alone or in combination with one or more of the first and second aspects, the cell barring information includes an indication of whether the UE is barred from establishing a connection with a cell associated with the network node.

In a fourth additional aspect, alone or in combination with one or more of the first through third aspects, the reference signal is associated with a mobility operation in an RRC idle mode, and the cell barring information is multiplexed or appended with the reference signal.

In a fifth additional aspect, alone or in combination with one or more of the first through fourth aspects, process 900 includes transmitting, to the UE, configuration information indicating respective cell barring information associated with one or more network energy states of the network node, where the information included in the WUS or the reference signal includes an indication of a network energy state, from the one or more network energy states, and where the cell barring information is indicated by the configuration information and the network energy state indicated by the WUS or the reference signal.

In a sixth additional aspect, alone or in combination with one or more of the first through fifth aspects, the cell barring information is based at least in part on a network energy state of the network node.

In a seventh additional aspect, alone or in combination with one or more of the first through sixth aspects, the cell barring information is indicated via at least one of a Layer 1 signal, a Layer 2 signal, or a Layer 3 signal.

In an eighth additional aspect, alone or in combination with one or more of the first through seventh aspects, the downlink buffer status report information indicates a quantity of bits, via a quantization level, associated with downlink data intended for the UE.

In a ninth additional aspect, alone or in combination with one or more of the first through eighth aspects, the UE is an energy harvesting device.

In a tenth additional aspect, alone or in combination with one or more of the first through ninth aspects, the quantization level is based at least in part on at least one of an energy harvesting class associated with the UE, an energy state associated with the UE, or a charging rate associated with the UE.

In an eleventh additional aspect, alone or in combination with one or more of the first through tenth aspects, process 900 includes receiving, from the UE, a feedback communication in response to the WUS or the reference signal.

In a twelfth additional aspect, alone or in combination with one or more of the first through eleventh aspects, the feedback communication indicates uplink buffer status report information associated with uplink data to be received by the network node.

In a thirteenth additional aspect, alone or in combination with one or more of the first through twelfth aspects, the feedback communication indicates whether the UE is able to receive a downlink communication having a size indicated by the downlink buffer status report information.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
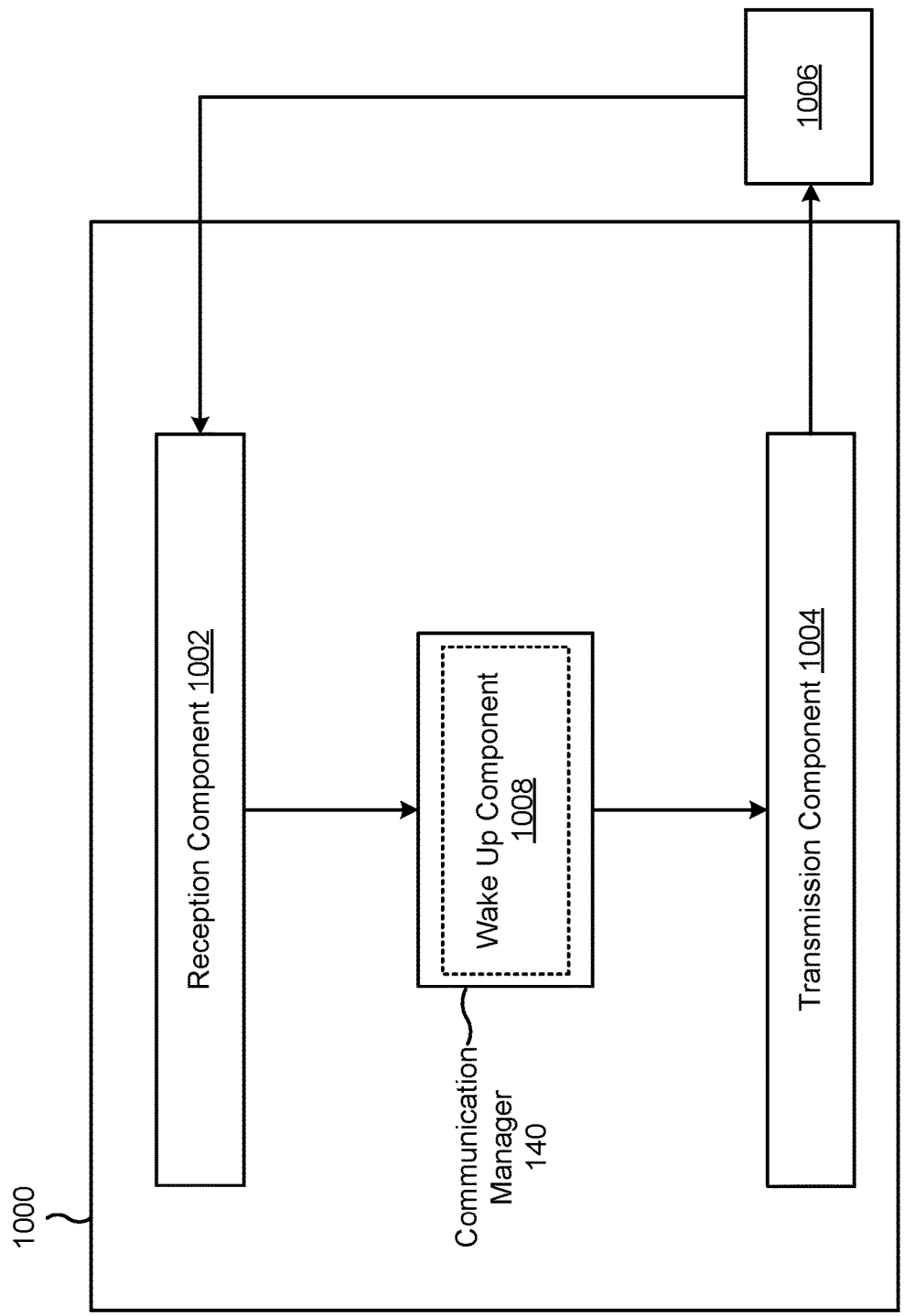
FIG. 10 is a diagram of an example apparatus for wireless communication in accordance with the present disclosure.

FIG. 10 is a diagram of an example apparatus 1000 for wireless communication in accordance with the present disclosure. The apparatus 1000 may be a UE, or a UE may include the apparatus 1000. In some aspects, the apparatus 1000 includes a reception component 1002, a transmission component 1004, and a communication manager 140, which may be in communication with one another (for example, via one or more buses). As shown, the apparatus 1000 may communicate with another apparatus 1006 (such as a UE, a base station, a network node, a network entity, or another wireless communication device) using the reception component 1002 and the transmission component 1004.

In some aspects, the apparatus 1000 may be configured to perform one or more operations described herein in connection with FIG. 7. Additionally or alternatively, the apparatus 1000 may be configured to perform one or more processes described herein, such as process 800 of FIG. 8, or a combination thereof. In some aspects, the apparatus 1000 may include one or more components of the UE described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 140. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, the communication manager 140 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The communication manager 140 may receive or may cause the reception component 1002 to receive, from a network node and via a first receiver component (for example, via a first set of components associated with the reception component 1002 or the transmission component 1004) associated with the UE, a WUS or a reference signal indicating information including at least one of cell barring information, downlink buffer status report information, or an indication to monitor a synchronization signal. The communication manager 140 may communicate or may cause the reception component 1002 or the transmission component 1004 to communicate, via a second receiver component (for example, via a second set of components associated with the reception component 1002 or the transmission component 1004) associated with the UE, one or more signals based at least in part on the information included in the WUS or the reference signal. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a wake up component 1008, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, from a network node and via a first receiver component associated with the UE, a WUS or a reference signal indicating information including at least one of cell barring information, downlink buffer status report information, or an indication to monitor a synchronization signal. The reception component 1002 or the transmission component 1004 may communicate, via a second receiver component associated with the UE, one or more signals based at least in part on the information included in the WUS or the reference signal.

The reception component 1002 may receive, from the network node, configuration information indicating respective cell barring information associated with one or more network energy states, wherein the information included in the WUS or the reference signal includes an indication of a network energy state, from the one or more network energy states, and wherein the cell barring information is indicated by the configuration information and the network energy state indicated by the WUS or the reference signal.

The transmission component 1004 may transmit, via the first receiver component, a feedback communication in response to the WUS or the reference signal.

The wake up component 1008 may perform an action to cause the second receiver component to transition from a sleep state to an active state based at least in part on the information included in the WUS or the reference signal, wherein a timing at which the second receiver component transitions to the active state is based at least in part on at least one of a last symbol associated with the WUS or the reference signal, a last symbol of a feedback communication transmitted by the UE in response to the WUS or the reference signal, or a first downlink control channel monitoring occasion that is at least an amount of time from the last symbol associated with the WUS or the reference signal.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
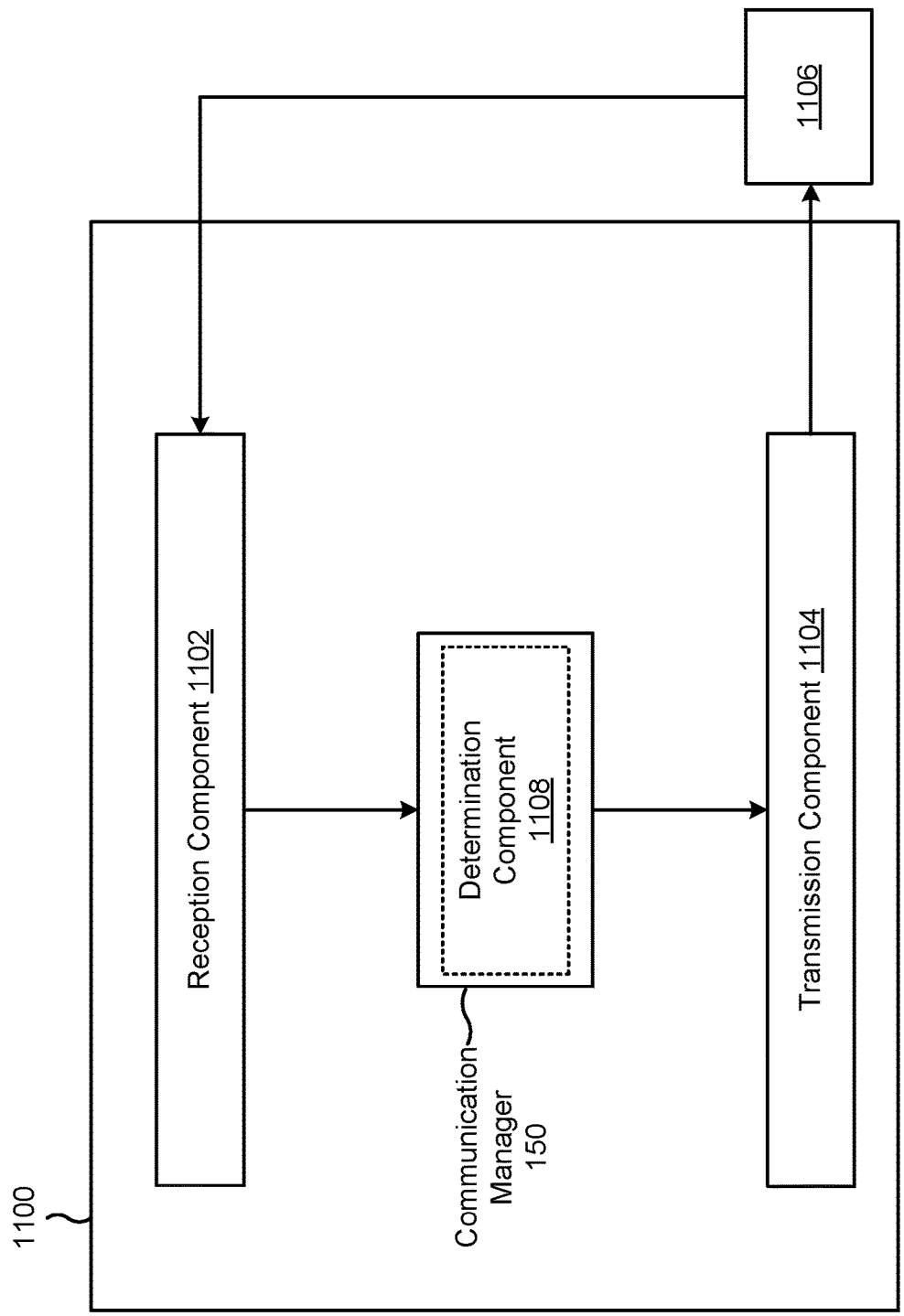
FIG. 11 is a diagram of an example apparatus for wireless communication in accordance with the present disclosure.

FIG. 11 is a diagram of an example apparatus 1100 for wireless communication in accordance with the present disclosure. The apparatus 1100 may be a network node, or a network node may include the apparatus 1100. In some aspects, the apparatus 1100 includes a reception component 1102, a transmission component 1104, and a communication manager 150, which may be in communication with one another (for example, via one or more buses). As shown, the apparatus 1100 may communicate with another apparatus 1106 (such as a UE, a base station, a network node, a network entity, or another wireless communication device) using the reception component 1102 and the transmission component 1104.

In some aspects, the apparatus 1100 may be configured to perform one or more operations described herein in connection with FIG. 7. Additionally or alternatively, the apparatus 1100 may be configured to perform one or more processes described herein, such as process 900 of FIG. 9, or a combination thereof. In some aspects, the apparatus 1100 may include one or more components of the network node described above in connection with FIG. 2.

The reception component 1102 may receive communications, such as reference signals, control information, data communications, or a combination thereof, from the apparatus 1106. The reception component 1102 may provide received communications to one or more other components of the apparatus 1100, such as the communication manager 150. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, a memory, or a combination thereof, of the network node described above in connection with FIG. 2.

The transmission component 1104 may transmit communications, such as reference signals, control information, data communications, or a combination thereof, to the apparatus 1106. In some aspects, the communication manager 150 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described above in connection with FIG. 2. In some aspects, the transmission component 1104 may be co-located with the reception component 1102 in a transceiver.

The communication manager 150 may transmit or may cause the transmission component 1104 to transmit a WUS or a reference signal, intended for a UE, indicating information including at least one of: cell barring information, downlink buffer status report information, or an indication to monitor a synchronization signal. The communication manager 150 may communicate, or may cause the transmission component 1104 or the reception component 1102 to communicate, one or more signals associated with the UE based at least in part on the information included in the WUS or the reference signal. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network node described above in connection with FIG. 2. In some aspects, the communication manager 150 includes a set of components, such as a determination component 1108, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1104 may transmit a WUS or a reference signal, intended for UE indicating information including at least one of: cell barring information, downlink buffer status report information, or an indication to monitor a synchronization signal. The transmission component 1104 or the reception component 1102 may communicate one or more signals associated with the UE based at least in part on the information included in the WUS or the reference signal.

The transmission component 1104 may transmit, to the UE, configuration information indicating respective cell barring information associated with one or more network energy states of the network node, wherein the information included in the WUS or the reference signal includes an indication of a network energy state, from the one or more network energy states, and wherein the cell barring information is indicated by the configuration information and the network energy state indicated by the WUS or the reference signal.

The determination component 1108 may determine the information to be included in the WUS or the reference signal.

The reception component 1102 may receive, from the UE, a feedback communication in response to the WUS or the reference signal.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network node and via a first receiver component associated with the UE, a wakeup signal (WUS) or a reference signal indicating information including at least one of cell barring information, downlink buffer status report information, or an indication to monitor a synchronization signal; and communicating, via a second receiver component associated with the UE, one or more signals based at least in part on the information included in the WUS or the reference signal.

Aspect 2: The method of Aspect 1, wherein the first receiver component is associated with a first power consumption level and the second receiver component is associated with a second power consumption level, and wherein the second power consumption level is greater than the first power consumption level.

Aspect 3: The method of any of Aspects 1-2, wherein the second receiver component is in a sleep state when the WUS or the reference signal is received via the first receiver component.

Aspect 4: The method of any of Aspects 1-3, wherein the UE is associated with a radio resource control (RRC) idle mode when the WUS or the reference signal is received via the first receiver component.

Aspect 5: The method of any of Aspects 1-4, wherein the cell barring information includes an indication of whether the UE is barred from establishing a connection with a cell associated with the network node.

Aspect 6: The method of Aspect 5, wherein the cell barring information indicates that the UE is barred from establishing the connection with the cell, and wherein communicating the one or more signals comprises: performing an action to cause the second receiver component to transition from a sleep state to an active state based at least in part on the UE being barred from establishing the connection with the cell; and communicating, with one or more other network nodes and via the second receiver component, the one or more signals, wherein the one or more signals are associated with a cell search procedure.

Aspect 7: The method of any of Aspects 1-6, wherein the reference signal is associated with a mobility operation in a radio resource control (RRC) idle mode, and wherein the cell barring information is multiplexed with or appended to the reference signal.

Aspect 8: The method of any of Aspects 1-7, further comprising receiving, from the network node, configuration information indicating respective cell barring information associated with one or more network energy states, wherein the information included in the WUS or the reference signal includes an indication of a network energy state, from the one or more network energy states, and wherein the cell barring information is indicated by the configuration information and the network energy state indicated by the WUS or the reference signal.

Aspect 9: The method of any of Aspects 1-8, wherein the cell barring information is based at least in part on a network energy state of the network node.

Aspect 10: The method of Aspect 9, wherein the cell barring information is indicated via at least one of a Layer 1 signal, a Layer 2 signal, or a Layer 3 signal.

Aspect 11: The method of any of Aspects 1-10, wherein the downlink buffer status report information indicates a quantity of bits, via a quantization level, associated with downlink data intended for the UE, the method further comprising: performing an action to cause the second receiver component to transition from a sleep state to an active state based at least in part on the quantity of bits satisfying a threshold.

Aspect 12: The method of Aspect 11, wherein the UE is an energy harvesting device.

Aspect 13: The method of any of Aspects 11-12, wherein the quantization level or the threshold is based at least in part on at least one of: an energy harvesting class associated with the UE, an energy state associated with the UE, or a charging rate associated with the UE.

Aspect 14: The method of any of Aspects 1-13, further comprising transmitting, via the first receiver component, a feedback communication in response to the WUS or the reference signal.

Aspect 15: The method of Aspect 14, wherein the feedback communication indicates uplink buffer status report information associated with uplink data to be transmitted via the second receiver component.

Aspect 16: The method of any of Aspects 14-15, wherein the feedback communication indicates whether the UE is able to receive a downlink communication having a size indicated by the downlink buffer status report information.

Aspect 17: The method of any of Aspects 1-16, further comprising performing an action to cause the second receiver component to transition from a sleep state to an active state based at least in part on the information included in the WUS or the reference signal, wherein a timing at which the second receiver component transitions to the active state is based at least in part on at least one of: a last symbol associated with the WUS or the reference signal, a last symbol of a feedback communication transmitted by the UE in response to the WUS or the reference signal, or a first downlink control channel monitoring occasion that is at least an amount of time from the last symbol associated with the WUS or the reference signal.

Aspect 18: The method of Aspect 17, wherein the amount of time is based at least in part on at least one of: a capability associated with the UE, an energy harvesting class associated with the UE, an energy state associated with the UE, or a charging rate associated with the UE.

Aspect 19: A method of wireless communication performed by a network node, comprising: transmitting a wakeup signal (WUS) or a reference signal, intended for a user equipment (UE) indicating information including at least one of: cell barring information, downlink buffer status report information, or an indication to monitor a synchronization signal; and communicating one or more signals associated with the UE based at least in part on the information included in the WUS or the reference signal.

Aspect 20: The method of Aspect 19, wherein the WUS or the reference signal is a low power signal.

Aspect 21: The method of any of Aspects 19-20, wherein the UE is associated with a radio resource control (RRC) idle mode when the WUS or the reference signal is transmitted.

Aspect 22: The method of any of Aspects 19-21, wherein the cell barring information includes an indication of whether the UE is barred from establishing a connection with a cell associated with the network node.

Aspect 23: The method of any of Aspects 19-22, wherein the reference signal is associated with a mobility operation in a radio resource control (RRC) idle mode, and wherein the cell barring information is multiplexed or appended with the reference signal.

Aspect 24: The method of any of Aspects 19-23, further comprising transmitting, to the UE, configuration information indicating respective cell barring information associated with one or more network energy states of the network node, wherein the information included in the WUS or the reference signal includes an indication of a network energy state, from the one or more network energy states, and wherein the cell barring information is indicated by the configuration information and the network energy state indicated by the WUS or the reference signal.

Aspect 25: The method of any of Aspects 19-24, wherein the cell barring information is based at least in part on a network energy state of the network node.

Aspect 26: The method of Aspect 25, wherein the cell barring information is indicated via at least one of a Layer 1 signal, a Layer 2 signal, or a Layer 3 signal.

Aspect 27: The method of any of Aspects 19-26, wherein the downlink buffer status report information indicates a quantity of bits, via a quantization level, associated with downlink data intended for the UE.

Aspect 28: The method of Aspect 27, wherein the UE is an energy harvesting device.

Aspect 29: The method of any of Aspects 27-28, wherein the quantization level is based at least in part on at least one of: an energy harvesting class associated with the UE, an energy state associated with the UE, or a charging rate associated with the UE.

Aspect 30: The method of any of Aspects 19-29, further comprising receiving, from the UE, a feedback communication in response to the WUS or the reference signal.

Aspect 31: The method of Aspect 30, wherein the feedback communication indicates uplink buffer status report information associated with uplink data to be received by the network node.

Aspect 32: The method of any of Aspects 30-31, wherein the feedback communication indicates whether the UE is able to receive a downlink communication having a size indicated by the downlink buffer status report information.

Aspect 33: An apparatus for wireless communication at a device, comprising a processor; memory coupled with the processor; and instructions stored in the memory and executable by the processor to cause the apparatus to perform the method of one or more of Aspects 1-18.

Aspect 34: A device for wireless communication, comprising a memory and one or more processors coupled to the memory, the one or more processors configured to perform the method of one or more of Aspects 1-18.

Aspect 35: An apparatus for wireless communication, comprising at least one means for performing the method of one or more of Aspects 1-18.

Aspect 36: A non-transitory computer-readable medium storing code for wireless communication, the code comprising instructions executable by a processor to perform the method of one or more of Aspects 1-18.

Aspect 37: A non-transitory computer-readable medium storing a set of instructions for wireless communication, the set of instructions comprising one or more instructions that, when executed by one or more processors of a device, cause the device to perform the method of one or more of Aspects 1-18.

Aspect 38: An apparatus for wireless communication at a device, comprising a processor; memory coupled with the processor; and instructions stored in the memory and executable by the processor to cause the apparatus to perform the method of one or more of Aspects 19-32.

Aspect 39: A device for wireless communication, comprising a memory and one or more processors coupled to the memory, the one or more processors configured to perform the method of one or more of Aspects 19-32.

Aspect 40: An apparatus for wireless communication, comprising at least one means for performing the method of one or more of Aspects 19-32.

Aspect 41: A non-transitory computer-readable medium storing code for wireless communication, the code comprising instructions executable by a processor to perform the method of one or more of Aspects 19-32.

Aspect 42: A non-transitory computer-readable medium storing a set of instructions for wireless communication, the set of instructions comprising one or more instructions that, when executed by one or more processors of a device, cause the device to perform the method of one or more of Aspects 19-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one memory; and
   at least one processor communicatively coupled with the at least one memory, the at least one processor configured to cause the UE to:
      receive, from a network node and via a first receiver component of the UE, a wakeup signal (WUS); and
      communicate, via a second receiver component of the UE, one or more signals in accordance with information in the WUS and whether a time duration between a last symbol of the WUS and a first downlink control channel monitoring occasion following the WUS satisfies a threshold.

2. The UE of claim 1, wherein the UE is associated with a radio resource control (RRC) idle mode when the WUS is received via the first receiver component.

3. The UE of claim 1, wherein the information in the WUS includes cell barring information that indicates whether the UE is barred from establishing a connection with a cell associated with the network node.

4. The UE of claim 3, wherein, in accordance with the cell barring information indicating that the UE is barred from establishing the connection with the cell, the at least one processor is configured to cause the UE to communicate the one or more signals
   to one or more other network nodes via the second receiver component, the one or more signals being associated with a cell search procedure.

5. The UE of claim 3, wherein the WUS is associated with a mobility operation in a radio resource control (RRC) idle mode, and wherein the cell barring information is multiplexed with or appended to the WUS.

6. The UE of claim 1, wherein the at least one processor is further configured to cause the UE to receive, from the network node, configuration information indicating respective cell barring information associated with one or more network energy states,
   wherein the information in the WUS includes an indication of a network energy state from the one or more network energy states, and
   wherein the at least one processor is configured to cause the UE to communicate the one or more signals in accordance with the respective cell barring information associated with the network energy state indicated by the WUS.

7. The UE of claim 1, wherein the information in the WUS includes downlink buffer status report information that indicates a quantity of bits, via a quantization level, associated with downlink data intended for the UE, and wherein the at least one processor is configured to cause the UE to communicate the one or more signals in accordance with:
   the quantity of bits satisfying a second threshold.

8. The UE of claim 7, wherein the quantization level or the second threshold is based at least in part on at least one of:
   an energy harvesting class associated with the UE,
   an energy state associated with the UE, or
   a charging rate associated with the UE.

9. The UE of claim 1, wherein the at least one processor is further configured to cause the UE to transmit, via the first receiver component, feedback in accordance with the WUS.

10. The UE of claim 9, wherein the feedback indicates uplink buffer status report information associated with uplink data to be transmitted via the second receiver component.

11. The UE of claim 1, wherein the at least one processor is further configured to cause the UE to perform an action to cause the second receiver component to transition from a sleep state to an active state to communicate the one or more signals.

12. The UE of claim 1, wherein the threshold is based at least in part on a capability of the UE.

13. The UE of claim 1, wherein the at least one processor is further configured to cause the UE to monitor, via the second receiver component, the first downlink control channel monitoring occasion for downlink control information in accordance with the information in the WUS and the time duration satisfying the threshold, wherein the communication of the one or more signals with the network node is in accordance with the downlink control information.

14. A network node for wireless communication, comprising:
at least one memory; and
at least one processor communicatively coupled with the at least one memory, the at least one processor configured to cause the network node to:
transmit a wakeup signal (WUS) to a user equipment (UE); and
communicate one or more signals with the UE in accordance with information in the WUS and whether a time duration between a last symbol of the WUS and a first downlink control channel monitoring occasion following the WUS satisfies a threshold.

15. The network node of claim 14, wherein the information in the WUS includes cell barring information that indicates whether the UE is barred from establishing a connection with a cell associated with the network node.

16. The network node of claim 15, wherein the WUS is associated with a mobility operation in a radio resource control (RRC) idle mode, and wherein the cell barring information is multiplexed or appended with the WUS.

17. A method of wireless communication performed by a user equipment (UE), comprising:
receiving, from a network node and via a first receiver component of the UE, a wakeup signal (WUS); and
communicating, via a second receiver component of the UE, one or more signals in accordance with information in the WUS and whether a time duration between a last symbol of the WUS and a first downlink control channel monitoring occasion following the WUS satisfies a threshold.

18. The method of claim 17, wherein the second receiver component is in a sleep state when the WUS is received via the first receiver component.

19. The method of claim 17, wherein the information in the WUS includes cell barring information that indicates whether the UE is barred from establishing a connection with a cell associated with the network node.

20. The method of claim 19, wherein, in accordance with the cell barring information indicating that the UE is barred from establishing the connection with the cell, the communicating the one or more signals comprises
communicating the one or more signals to one or more other network nodes via the second receiver component, the one or more signals being associated with a cell search procedure.

21. The method of claim 19, wherein WUS is associated with a mobility operation in a radio resource control (RRC) idle mode, and wherein the cell barring information is multiplexed with or appended to the WUS.

22. The method of claim 17, wherein the information in the WUS includes cell barring information that is based at least in part on a network energy state of the network node.

23. The method of claim 22, wherein the cell barring information is indicated via at least one of a Layer 1 signal, a Layer 2 signal, or a Layer 3 signal.

24. The method of claim 17, wherein the information in the WUS includes downlink buffer status report information that indicates a quantity of bits, via a quantization level, associated with downlink data intended for the UE, and wherein communicating the one or more signals comprises communicating the one or more signals in accordance with the quantity of bits satisfying a second threshold.

25. The method of claim 17, wherein the information in the WUS includes downlink buffer status information, the method further comprising transmitting, via the first receiver component, feedback in accordance with the WUS, the feedback indicating whether the UE is able to receive a downlink communication having a size indicated by the downlink buffer status report information.

26. The method of claim 17, further comprising performing an action to cause the second receiver component to transition from a sleep state to an active state to communicate the one or more signals.

27. A method of wireless communication performed by a network node, comprising:
transmitting a wakeup signal (WUS) to a user equipment (UE); and
communicating one or more signals associated with the UE in accordance with information included in the WUS and whether a time duration between a last symbol of the WUS and a first downlink control channel monitoring occasion following the WUS satisfies a threshold.

28. The method of claim 27, further comprising transmitting, to the UE, configuration information indicating respective cell barring information associated with one or more network energy states of the network node,
wherein the information in the WUS includes an indication of a network energy state, from the one or more network energy states, and
wherein the communicating the one or more signals is in accordance with the respective cell barring information associated with the network energy state indicated by the WUS.

29. The method of claim 17, wherein the threshold is based at least in part on a capability of the UE.

30. The method of claim 17, further comprising monitoring, via the second receiver component, the first downlink control channel monitoring occasion for downlink control information in accordance with the information in the WUS and the time duration satisfying the threshold, wherein the communicating the one or more signals with the network node is in accordance with the downlink control information.

* * * * *